(12) United States Patent
Asaka et al.

(10) Patent No.: US 11,137,707 B2
(45) Date of Patent: Oct. 5, 2021

(54) FIXING APPARATUS WITH PRESSING MEMBER HAVING CONNECTED PORES IN ELASTIC LAYER

(71) Applicant: CANON KABUSHIKI KAISHA, Tokyo (JP)

(72) Inventors: Akeshi Asaka, Kashiwa (JP); Naoki Akiyama, Moriya (JP); Hiroto Sugimoto, Toride (JP); Hiroki Muramatsu, Tokyo (JP); Yasuhiro Miyahara, Tokyo (JP); Noriaki Kobayashi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/444,216

(22) Filed: Jun. 18, 2019

(65) Prior Publication Data
US 2020/0019100 A1    Jan. 16, 2020

(30) Foreign Application Priority Data

Jul. 10, 2018  (JP) .............................. JP2018-130413

(51) Int. Cl.
*G03G 15/20* (2006.01)
*B29C 44/12* (2006.01)
(Continued)

(52) U.S. Cl.
CPC ....... *G03G 15/206* (2013.01); *G03G 15/2053* (2013.01); *G03G 15/2064* (2013.01);
(Continued)

(58) Field of Classification Search
CPC ............ G03G 15/2053; G03G 15/206; G03G 15/2064; G03G 2215/2035;
(Continued)

(56) References Cited

U.S. PATENT DOCUMENTS

| 5,930,570 A * | 7/1999 | Saito .................... B29C 44/352 |
| | | 399/279 |
| 7,462,146 B2 * | 12/2008 | Nagata ................... B29C 35/02 |
| | | 492/30 |

(Continued)

FOREIGN PATENT DOCUMENTS

| JP | 4-131227 A | 5/1992 |
| JP | 4-158011 A | 6/1992 |

(Continued)

*Primary Examiner* — Robert B Beatty
(74) *Attorney, Agent, or Firm* — Venable LLP

(57) ABSTRACT

A fixing apparatus includes an endless belt, and a pressing member including a base body and an elastic layer formed on the base body. A plurality of pore portions connected to each other are provided in the elastic layer. In a case where a binary image is generated from a three-dimensional image of the elastic layer, a threshold value X μm corresponding to opening processing with which a number of pores derived from the pore portions takes a maximum value is obtained, and then pores derived from the pore portions in the elastic layer are extracted by performing opening processing with a threshold value of 2X μm, an average value of angles θ is 120° or larger and smaller than 150°.

7 Claims, 14 Drawing Sheets

(51) Int. Cl.
  *B29C 44/42* (2006.01)
  *B29L 31/00* (2006.01)
  *B29C 33/56* (2006.01)
  *B29K 83/00* (2006.01)
  *B29K 507/04* (2006.01)
  *B29C 44/34* (2006.01)

(52) U.S. Cl.
  CPC .............. *B29C 33/56* (2013.01); *B29C 44/12* (2013.01); *B29C 44/3415* (2013.01); *B29C 44/42* (2013.01); *B29K 2083/005* (2013.01); *B29K 2507/04* (2013.01); *B29L 2031/767* (2013.01); *G03G 15/2057* (2013.01); *G03G 2215/2035* (2013.01); *G03G 2215/2051* (2013.01); *G03G 2215/2054* (2013.01)

(58) Field of Classification Search
  CPC ... G03G 2215/2051; G03G 2215/2054; B29K 2083/005; B29K 2507/04
  USPC .................................................. 399/329, 331
  See application file for complete search history.

(56) References Cited

U.S. PATENT DOCUMENTS

| | | | |
|---|---|---|---|
| 8,909,119 B2 | 12/2014 | Miyahara et al. | |
| 9,086,664 B2 | 7/2015 | Matsunaka et al. | |
| 9,110,411 B2 | 8/2015 | Akiyama et al. | |
| 9,235,174 B2 | 1/2016 | Akiyama et al. | |
| 9,268,273 B2 | 2/2016 | Miyahara et al. | |
| 9,335,690 B2 | 5/2016 | Asaka et al. | |
| 9,348,282 B2 | 5/2016 | Tamura et al. | |
| 9,348,283 B2 | 5/2016 | Takada et al. | |
| 9,367,009 B2 | 6/2016 | Akiyama et al. | |
| 9,459,572 B2 | 10/2016 | Akiyama et al. | |
| 9,678,452 B2 * | 6/2017 | Watanabe | G03G 15/0233 |
| 9,701,053 B2 | 7/2017 | Asaka et al. | |
| 2008/0124637 A1 * | 5/2008 | Uematsu | G03G 5/00 430/56 |
| 2014/0116599 A1 | 5/2014 | Miyahara et al. | |
| 2015/0309451 A1 | 10/2015 | Akiyama et al. | |
| 2016/0018765 A1 * | 1/2016 | Tamura | G03G 15/206 399/333 |
| 2016/0018772 A1 * | 1/2016 | Miura | G03G 15/206 399/333 |
| 2018/0210354 A1 * | 7/2018 | Asaka | G03G 15/206 |
| 2018/0284659 A1 | 10/2018 | Miura et al. | |

FOREIGN PATENT DOCUMENTS

| | | | |
|---|---|---|---|
| JP | 2001-265147 A | | 9/2001 |
| JP | 2002-114860 A | | 4/2002 |
| JP | 2008-150552 A | * | 7/2008 |
| JP | 2019090880 A | * | 6/2019 |

* cited by examiner

THRESHOLD VALUE OF OPENING PROCESSING

AXIAL DIRECTION OF PRESSING ROLLER

INNER VIEW

OUTER VIEW

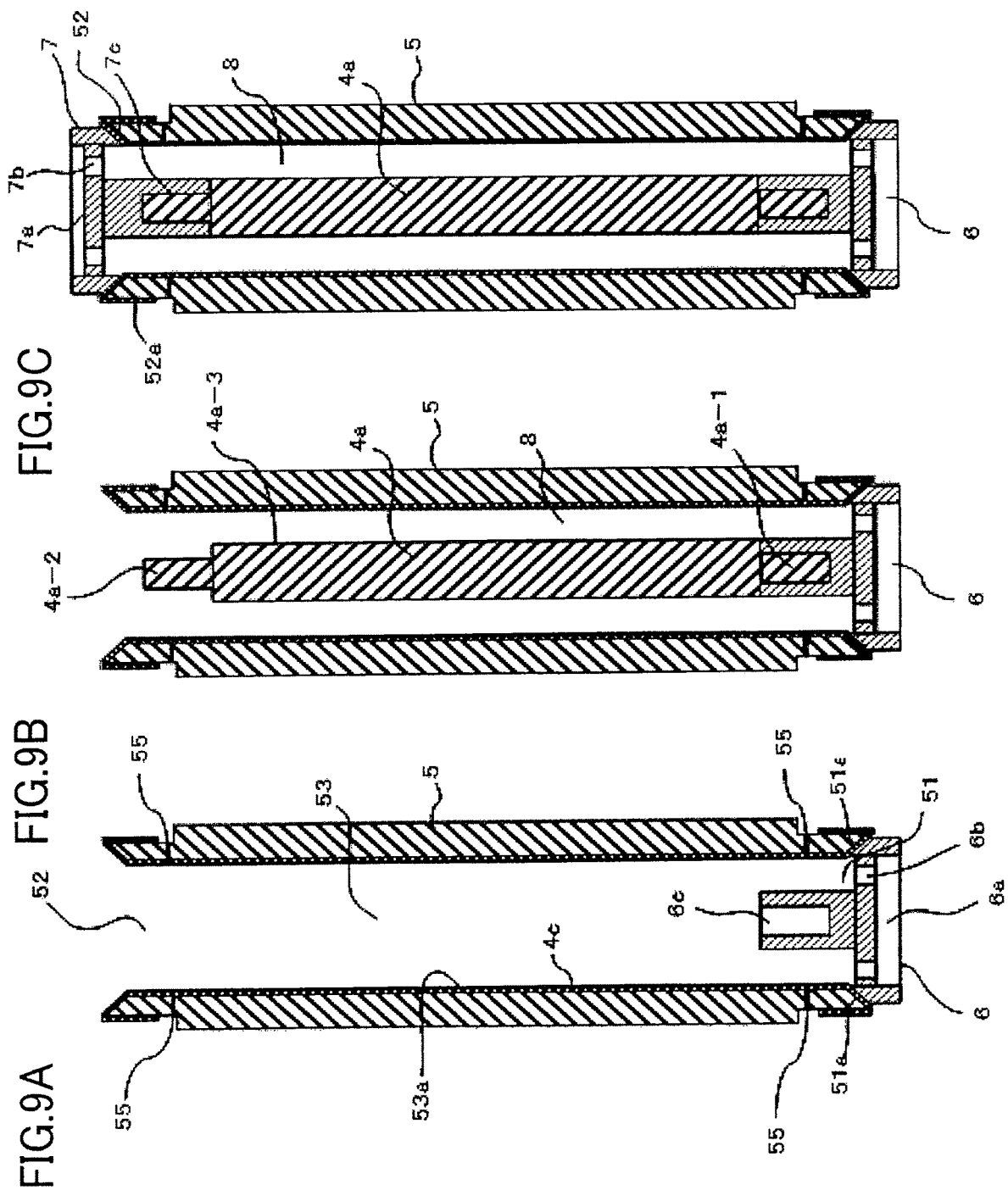

FIXING APPARATUS WITH PRESSING MEMBER HAVING CONNECTED PORES IN ELASTIC LAYER

BACKGROUND OF THE INVENTION

Field of the Invention

The present invention relates to a fixing apparatus incorporated in an image forming apparatus such as a copier, a printer, or a facsimile machine, and a manufacturing method for a pressing member.

Description of the Related Art

An image forming apparatus of an electrophotographic system includes a fixing apparatus that fixes a toner image to a recording material by heating and pressurizing the toner image formed on the recording material. The recording material will be hereinafter referred to as a sheet. This fixing apparatus includes fixing members such as a heating roller/belt and a pressing roller/belt, and performs a fixing process at a fixing nip portion, which is a position at which these are in pressure contact.

Examples of the fixing apparatus include an apparatus of a film heating system or a belt heating system. This apparatus includes a heater as a heating member, or a heat source, that includes a heating resistor on a ceramic substrate. In addition, this apparatus includes an endless fixing film serving as a heating member that covers the heater and rotates in contact with the heater. The endless fixing film will be hereinafter referred to as a film. Further, this apparatus includes a pressing roller, or a pressing member, as a nip portion forming member that comes into pressure contact with the film to form a nip portion, and rotationally drives the film.

According to this film heating system, the heat capacity and size of the film can be reduced, and thus energy consumption of the fixing apparatus can be reduced. In addition, according to this film heating system, time required for the temperature of the film to reach a predetermined temperature sufficient for heating and fixing the toner image, that is, a warm-up time, can be shortened.

Incidentally, in the fixing apparatus of a film heating system using an endless film, a phenomenon that the film moves to one side or the other side in a width direction serving as a rotation axis direction perpendicular to a sheet conveyance direction serving as a recording material conveyance direction such that the film is biased toward one side or the other side occurs. This phenomenon will be referred to as film eccentricity. Therefore, fixing flange s serving as regulation members that rotatably hold the film and regulate the biased movement of the film in the width direction is provided so as to fit in a fixing frame.

Examples of causes of the biasing force include eccentricity of the outer diameter of the film and the pressing roller that rotationally drives the film and eccentricity of a pressing force that presses the film against the pressing roller. However, the factor having the greatest impact is deviation of degree of parallel, that is, deviation of alignment between the film and the pressing roller. This deviation of degree of parallel derives from the degree of parallel and warpage of the frame that is caused when assembling constituent parts of the fixing apparatus, and it is difficult to eliminate this.

When the biasing force of the film become large, an edge portion of the film abuts a flange, and due to the load on the edge portion, the edge portion might wear, break, tear, or bend to be damaged.

Meanwhile, as the pressing roller, generally, a roller obtained by forming a rubber layer serving as an elastic layer on the outer periphery of a core metal and further forming a surface layer of fluorine resin on the outer periphery of the rubber elastic layer to impart releasability of toner is used. Examples of the fluorine resin include tetrafluoroethylene-perfluoroalkyl vinyl ether copolymer resin: PFA, tetrafluoroethylene resin: PTFE, and tetrafluoroethylene-hexafluoropropylene copolymer resin: FEP.

In such a fixing apparatus, reducing the heat capacity/thermal conductivity of the pressing roller to shorten the warm-up time is also attempted.

In Japanese Patent Laid-Open No. 2001-265147, the warm-up time is shortened by forming the rubber elastic layer of the pressing roller as a porous elastic layer having a plurality of pore portions and thus reducing heat transmitted to the pressing roller from the film heated by the operation of the fixing apparatus.

Japanese Patent Laid-Open No. 2002-114860 and Japanese Patent Laid-Open No. 2008-150552 disclose forming a large number of pore portions in the rubber elastic layer by emulsifying and dispersing a water-absorbing polymer in a liquid silicone rubber and removing the water after curing the rubber.

Japanese Patent Laid-Open No. H04-158011 and Japanese Patent Laid-Open No. H04-131227 disclose methods for molding a rubber elastic layer of the pressing roller. Specifically, a fluorine resin tube formed from PFA or the like is placed in a cylindrical mold and attached to the inner surface of the mold by vacuum suction, and then a core metal is placed at the center of the cylindrical mold. Then, the cylindrical mold is sealed by a pair of clamping mold pieces that clamp both end portions of the shaft of the core metal and both end portions of the cylindrical mold, and liquid rubber is injected into a space between the inner surface of the tube and the outer surface of the core metal. After the space inside the mold is filled with the liquid rubber, the liquid rubber is cured by heating the mold while keeping the sealed state of the mold. This method will be referred to as a casting method.

However, when a pressing roller molded by a casting method using a liquid silicone rubber composition in which water is dispersed in an emulsified manner was used for the fixing apparatus, the following phenomenon was observed. That is, in some cases, even in a state in which adjustment was made such that the degree of parallel between the film and the pressing roller was not deviated, the film rotated in accordance with the pressing roller was biased to abut a flange and was thus damaged. The liquid silicone rubber composition in which water is dispersed in an emulsified manner will be also referred to as a sponge-forming liquid silicone composition

SUMMARY OF THE INVENTION

The present invention provides a fixing apparatus whose durability is improved by reducing a biasing force of a film.

According to one aspect of the present invention is a fixing apparatus including an endless belt, and a pressing member including a base body and an elastic layer formed on the base body, the pressing member being in contact with the belt to form a nip portion where a recording material bearing an image is nipped, conveyed, and heated. A plurality of pore portions connected to each other are provided in the elastic layer. In a case where a binary image is generated from a three-dimensional image of the elastic layer, a threshold value X μm corresponding to opening processing with which a number of pores derived from the pore portions takes a maximum value is obtained, and then pores derived from the pore portions in the elastic layer are extracted by performing opening processing with a threshold value of 2X μm, an average value of angles θ is 120° or larger and smaller than 150°, wherein the angles θ are larger angles formed by major axis direction vectors of the pores and a longitudinal direction of the base body in a projection plane, wherein the projection plane is a section of the elastic layer taken along the longitudinal direction of the base body and is a plane onto which each of the pores is projected, and wherein the major axis direction vectors of the pores are each a line segment defining a maximum length of each of the pores in the projection plane.

According to another aspect of the present invention is a manufacturing method for a pressing member including a base body and an elastic layer including pore portions and formed on the base body from a rubber elastic member, the pressing member being in contact with an endless belt to form a nip portion where a recording material bearing an image is nipped, conveyed, and heated, the manufacturing method including a heat curing step of injecting a liquid rubber composition containing water into a mold holding the base body therein and heating and curing the rubber composition by heating the mold, and a pore portion forming step of forming pore portions in the heated and cured rubber composition by evaporating water from the rubber composition by heating the mold after the heat curing step in a state in which mold terminal members attached to a first end side and a second end side of the mold are detached and thus both end portions of the mold are open. In a case where the rubber composition is heated and cured by heating the mold in the heat curing step, a difference between heating temperature of the mold terminal member on the first end side and heating temperature of the mold terminal member on the second end side is 5° C. to 10° C. and an average value of the heating temperatures on the first end side and the second end side is 80° C. to 90° C.

Further features of the present invention will become apparent from the following description of exemplary embodiments with reference to the attached drawings.

BRIEF DESCRIPTION OF THE DRAWINGS

FIG. 9A is an explanatory diagram for describing how a roller base body is placed in the mold.

FIG. 9B is an explanatory diagram for describing how the roller base body is placed in the mold.

FIG. 9C is an explanatory diagram for describing how the roller base body is placed in the mold.

DESCRIPTION OF THE EMBODIMENTS

Exemplary Embodiment

An exemplary embodiment of the present invention will be described in detail below with reference to drawings.

Image Forming Apparatus

Figure 12:
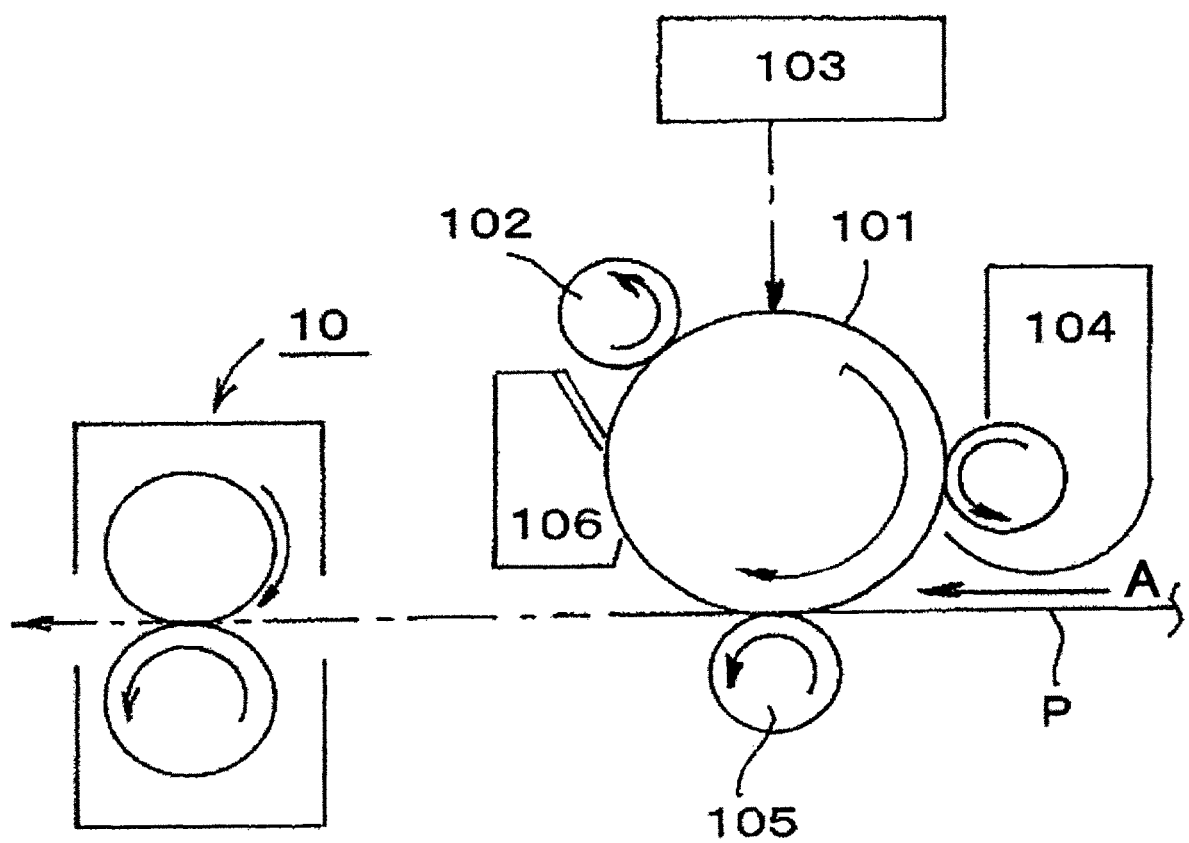
FIG. 12 is a diagram schematically illustrating a configuration of an example of an electrophotographic image forming apparatus.

FIG. 12 is a diagram schematically illustrating a configuration of an example of an image forming apparatus, which is an image forming apparatus of an electrophotographic system. This image forming apparatus includes an electrophotographic photosensitive member 101 that rotates, a charging unit 102 and an image exposing unit 103 serving as electrostatic latent image forming portions for the photosensitive member 101, and a developing unit 104 that develops the electrostatic latent image on the photosensitive member 101 as a toner image serving as a developer image. In addition, this image forming apparatus includes a transfer portion 105 that transfers the toner image on the photosensitive member 101 onto a sheet-shaped recording material P, and a cleaning portion 106 that cleans the surface of the photosensitive member 101 after transferring the toner image. The recording material will be hereinafter referred to as a paper sheet or a sheet.

In addition, this image forming apparatus includes a fixing apparatus 10 and so forth as a fixing unit, or an image heating unit, for fixing the toner image on the sheet P.

Fixing Apparatus

Figure 1:
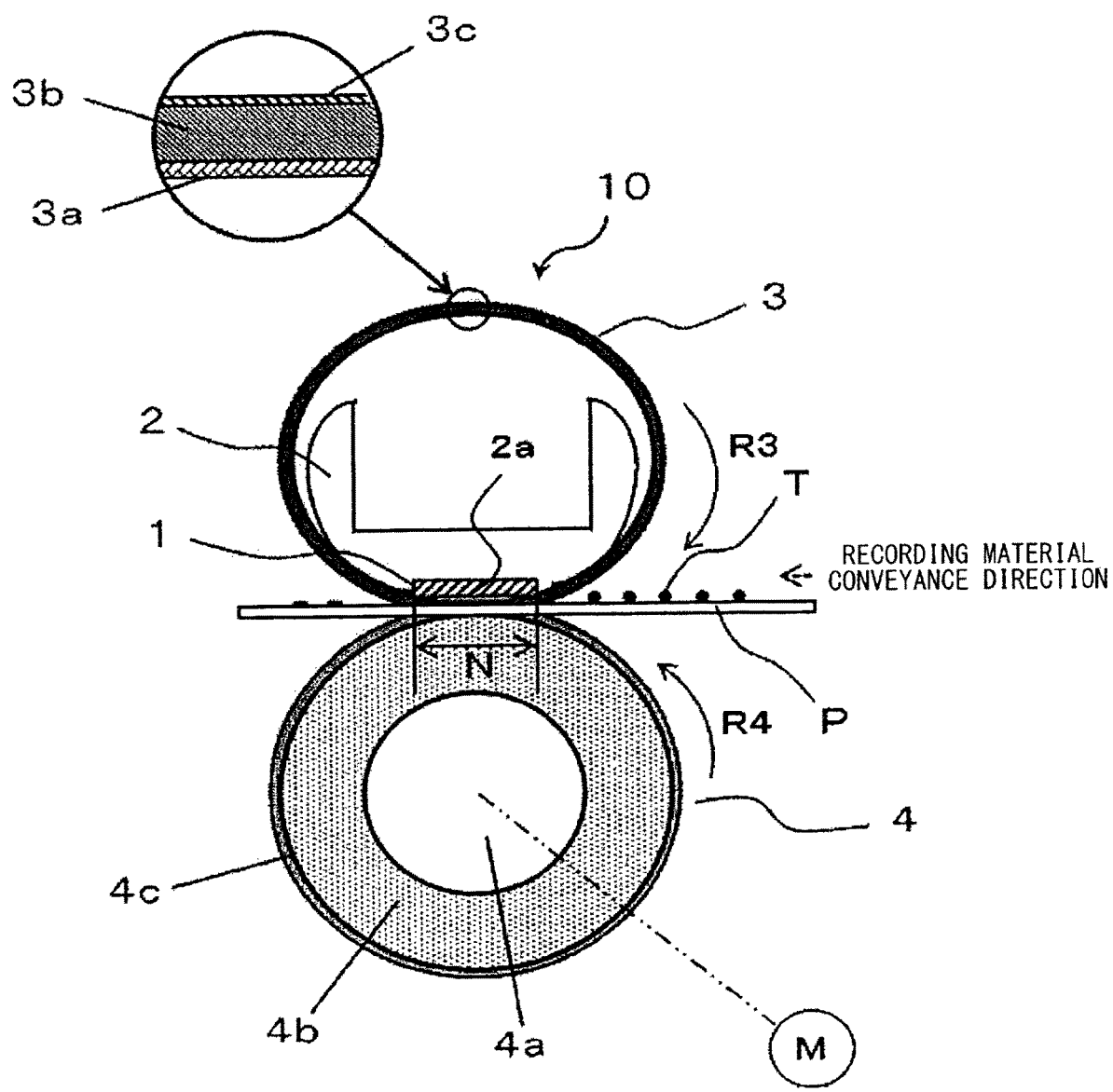
FIG. 1 is a schematic section view of a fixing apparatus according to an exemplary embodiment.

FIG. 1 is a schematic cross-sectional view of the fixing apparatus 10 of the present exemplary embodiment illustrating a schematic configuration thereof. In the description below, regarding the fixing apparatus and members constituting the fixing apparatus, an axial direction is a direction perpendicular to a sheet conveyance direction A serving as a recording material conveyance direction in the plane of the sheet. Length or width is the dimension in the axial direction or in a generating line direction of a rotary member.

The fixing apparatus 10 is a fixing apparatus of a film heating system or a belt heating system, and includes a ceramic heater 1 serving as a heating element and a film guide 2 also serving as a heating element support member.

The ceramic heater 1 will be hereinafter referred to as a heater 1. In addition, the fixing apparatus 10 includes a fixing film 3 serving as an endless heating rotary member, a heating member, and a fixing member that has an endless shape, that is, a tubular shape, and is flexible and heat-resistant. The fixing film 3 will be hereinafter referred to as a film 3. In addition, the fixing apparatus 10 includes a pressing roller 4 serving as a pressing member and a nip portion forming member that comes into mutual pressure contact with the film 3 to form a fixing nip portion N for nipping and conveying a sheet P bearing a toner image T and heating and fixing the toner image and rotationally driven to cause the film 3 to rotate accordingly.

The heater 1 is a thin and long plate-like member extending along the longitudinal direction of the film 3, which is a direction perpendicular to the drawings and includes a heat generation source such as a heating resistor that generates heat when power is supplied thereto from an unillustrated power supply unit, and the temperature thereof is quickly raised by the power supply. The temperature of the heater 1 is detected by an unillustrated temperature detection unit, and information of the detected temperature is input to an unillustrated controller. The controller controls the power supply from the power supply unit to the heat generation source such that the detected temperature input from the temperature detection unit is maintained at a predetermined fixing temperature, and thus adjusts the temperature of the heater 1 to a predetermined temperature.

The heater 1 is supported by the film guide 2 formed from a stiff heat-resistant material in a bowl shape that is approximately a semicircle shape in cross-section. The film guide 2 will be hereinafter referred to as a guide 2. More specifically, a groove portion 2a is provided on the outer surface of the guide 2 along the longitudinal direction of the guide 2, and the heater 1 is fit in the groove portion 2a.

The film 3 includes a ring-like or tubular substrate 3a, a film elastic layer 3b, and a surface layer 3c in this order from the inner side to the outer side. In this case, the film elastic layer 3b is referred to as a film elastic layer to distinguish this film from an elastic layer 4b of the pressing roller 4 that will be described later. The film 3 is an endless film whose inner peripheral surface is rubbed by the heater 1 and the guide 2 in a rotating state, and is put over the outer periphery of the guide 2 supporting the heater 1 with a margin from the peripheral length of the guide 2.

As will be described later, the heater 1 and the pressing roller 4 are in pressure contact with each other with the film 3 therebetween, and thus the nip portion N is formed between the film 3 and the pressing roller 4. The pressing roller 4 is rotationally driven in a counterclockwise direction indicated by an arrow R4 at a predetermined peripheral speed by a rotational driving unit M such as a motor serving as a driving rotary member. In accordance with the rotational drive of the pressing roller 4, the film 3 rotates in a clockwise direction indicated by an arrow R3 around the guide 2 while the inner surface thereof is in firm contact with and slides on the surface of the heater 1. Both end portions of the film 3 in the longitudinal direction are rotatably supported by flanges serving as regulation members that are not illustrated and are fixed to the fixing apparatus 10.

The guide 2 functions as a support member for the heater 1, and also functions as a rotation guide member for the film 3. Grease serving as a lubricant is applied on the inner peripheral surface of the film 3 to secure the slidability on the heater 1 and the guide 2.

The pressing roller 4 includes a base body 4a, an elastic layer 4b, and a releasing layer 4c in this order from the inner side to the outer side. The base body 4a has a solid rod shape, which is a columnar shape, or a pipe-like shape, which is a cylindrical shape. The pressing roller 4 is rotationally driven by, for example, a rotational driving unit M such as a motor, when using the apparatus. Therefore, both end portions of the base body 4a in the axial direction are rotatably supported by an unillustrated fixed portion such as a frame of the fixing apparatus 10 via bearing members.

In addition, the pressing roller 4 is disposed at such a position as to oppose the heater 1 supported by the guide 2 and nip the film 3 with the heater 1. Further, as a result of a predetermined pressure being applied to the pressing roller 4 and the film 3 by an unillustrated pressurizing mechanism, the pressing roller 4 and the film 3 come into pressure contact, and the elastic layers 3b and 4b thereof are elastically deformed. As a result of this, the nip portion N of a predetermined width in a sheet conveyance direction A is formed between the pressing roller 4 and the film 3.

The pressure contact between the film 3 serving as a heating member and the pressing roller 4 serving as a nip forming member may be established by pressing the pressing roller 4 against the film 3 or pressing the film 3 against the pressing roller 4. In addition, the pressure contact may be established by pressing the film 3 and the pressing roller 4 against each other by a predetermined pressure.

When the pressing roller 4 is rotationally driven by the rotational driving unit M, the pressing roller 4 nips and conveys the sheet P in the nip portion N between the pressing roller 4 and the film 3 rotating accordingly. In addition, the film 3 is heated by the heater 1 such that the temperature of the surface thereof reaches a predetermined value, for example, 200° C. As a result of the sheet P bearing an unfixed toner image T being introduced to and nipped and conveyed in the nip portion N, the unfixed toner image T on the sheet P is heated and pressurized. Thus, the unfixed toner image T melts and is blended to develop colors. Then, the sheet P is cooled and thus the toner image is fixed to the sheet P as a fixed image.

Fixing Film

The film 3 will be described. As illustrated in FIG. 1, in the film 3, the film elastic layer 3b is provided on the outer periphery of the substrate 3a, and the surface layer 3c is provided on the outer periphery of the film elastic layer 3b. Since heat resistance and flex resistance are required for the substrate 3a, for example, heat-resistant resin such as polyimide, polyamide-imide, or polyether ether ketone: PEEK is used for the substrate 3a.

In addition, considering thermal conductivity, metal such as stainless steel: SUS, nickel, or nickel alloy having a higher thermal conductivity than the heat-resistant resin may be used for the substrate 3a. Further, since the mechanical strength of the substrate 3a needs to be enhanced while reducing the heat capacity of the substrate 3a, the thickness of the substrate 3a is preferably set to 5 μm to 100 μm and more preferably set to 20 μm to 85 μm.

The film elastic layer 3b is a silicone rubber layer coating the outer periphery of the substrate 3a. The film elastic layer 3b covers and evenly heats the unfixed toner image T on the sheet P when the sheet P passes through the nip portion N. As a result of the film elastic layer 3b functioning in this manner, a high-quality image having high glossiness and no fixing unevenness can be obtained.

The thickness of the film elastic layer 3b is preferably set to 30 μm to 500 μm to obtain a high-quality image by sufficient elasticity and suppress elongation of the time of heating required for reaching the predetermined temperature caused by increase in the heat capacity. The thickness of the film elastic layer 3b is more preferably set to 100 μm to 300 μm.

Although the film elastic layer 3b is not particularly limited, it is preferable to use a liquid silicone rubber cross-linkable by an addition reaction because the liquid silicone rubber cross-linkable by an addition reaction is easy to process with a high dimensional precision and no byproduct is generated at the time of curing this liquid silicone rubber by heat. For example, the liquid silicone rubber cross-linkable by an addition reaction contains organopolysiloxane and organohydrogenpolysiloxane, and may further contain catalysts and other additives. Organopolysiloxane is a base polymer obtained from a silicone rubber as a raw material, and preferably has a number average molecular weight of 5,000 to 100,000 and a weight average molecular weight of 10,000 to 500,000.

The liquid silicone rubber is a polymer that is fluid at room temperature, is cured by heat, has an appropriately low hardness after being cured, and has sufficient heat resistance and a sufficient shape recovery property. Therefore, the liquid silicone rubber is suitably used not only for the film elastic layer 3b but also for the elastic layer 4b of the pressing roller 4 that will be described later.

Incidentally, if the film elastic layer 3b is formed from only the silicone rubber, the thermal conductivity of the film elastic layer 3b becomes low. In the case where the thermal conductivity of the film elastic layer 3b is low, heat generated by the heater 1 becomes less likely to be transmitted to the sheet P via the film 3, and thus there is a possibility that heating for fixing the toner to the sheet P becomes insufficient and image defects such as fixing unevenness occur.

Therefore, to increase the thermal conductivity of the film elastic layer 3b, a material having a high thermal conductivity such as granular high-thermal-conductivity filler is mixed and dispersed in the film elastic layer 3b. Examples of the granular high-thermal-conductivity filler include silicon carbide: SiC, zinc oxide: ZnO, alumina: $Al_2O_3$, aluminum nitride: AlN, magnesium oxide: MgO, and carbon.

In addition, needle-shaped high-thermal-conductivity filler or the like may be used instead of the granular high-thermal-conductivity filler depending on the purpose. That is, the shape of the high-thermal-conductivity filler may be various shapes such as a crashed shape, a plate shape and a whisker shape in addition to the granular shape and the needle shape, and any of these shapes of high-thermal-conductivity filler may be used for the film elastic layer 3b. In addition, these can be used alone or in combination of two or more kinds. To be noted, as a result of mixing the high-thermal-conductivity filler in the film elastic layer 3b, the film elastic layer 3b can also gain electrical conductivity.

The surface layer 3c is a fluorine resin layer coating the outer periphery of the film elastic layer 3b. The surface layer 3c is provided for making toner less likely to attach to the fixing film 3. For the surface layer 3c, fluorine resin such as tetrafluoroethylene-perfluoroalkyl vinyl ether copolymer resin: PFA, tetrafluoroethylene resin: PTFE, or tetrafluoroethylene-hexafluoropropylene copolymer resin: FEP may be used.

The thickness of the surface layer 3c is preferably 1 μm to 50 μm and more preferably 8 μm to 25 μm. To be noted, the surface layer 3c may be formed on the outer periphery of the film elastic layer 3b by covering the film elastic layer 3b by a fluorine resin tube or applying a paint containing fluorine resin on the film elastic layer 3b.

Pressing Roller

Figure 2A:
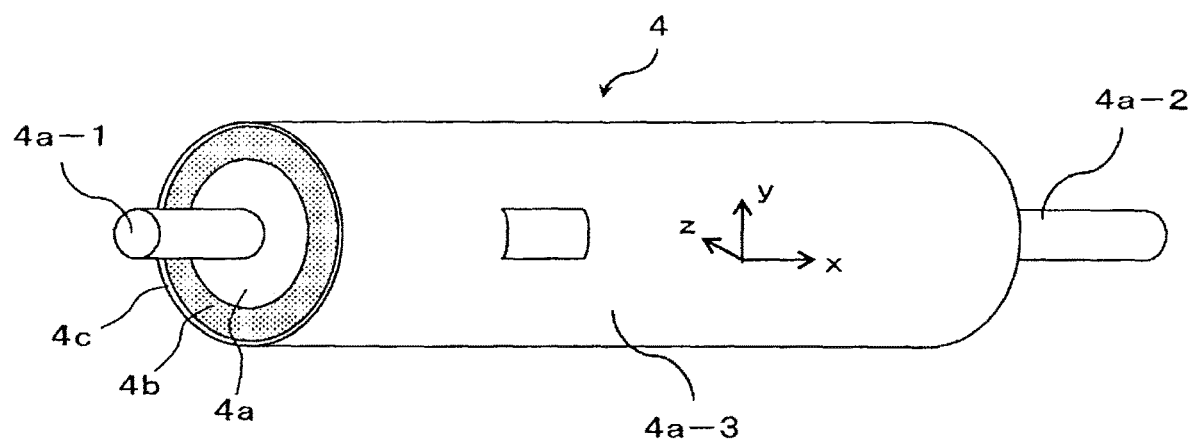
FIG. 2A is a perspective view of a pressing roller illustrating an overall configuration thereof.

The pressing roller 4 will be described. FIG. 2A is a schematic perspective view of the pressing roller 4 having elasticity and serving as a nip portion forming member and a pressing member. The pressing roller 4 has a multilayer structure including the elastic layer 4b formed on the outer periphery of the base body 4a in a roller shape concentric to the base body 4a, and a releasing layer 4c coated on the outer periphery of the elastic layer 4b. To be noted, as illustrated in FIG. 2A, the longitudinal direction, that is, axial direction of the pressing roller 4 will be expressed as an "x" direction, the circumferential direction of the pressing roller 4, that is, the sheet conveyance direction will be expressed as a "y" direction, and the thickness direction of the constituent layers of the pressing roller 4, that is, a layer thickness direction will be expressed as a "z" direction.

Base Body

The base body 4a is a shaft core body or a core metal formed from stainless steel, phosphor bronze, aluminum, or the like. Examples of the stainless steel include steel materials such as sulfur and sulfur-composite free-cutting steel: SUM material plated with nickel, chromium, or the like. The outer diameter of the base body 4a may be 4 mm to 80 mm.

Portions 4a-1 and 4a-2 are small-diameter shaft portions concentrically and integrally provided with the base body 4a respectively on the first end side and the second end side of the base body 4a. The small-diameter shaft portions 4a-1 and 4a-2 on the first end side and the second end side are portions which are rotatably supported by the unillustrated fixed portion such as the frame of the fixing apparatus 10 via bearing members. A portion 4a-3 is the outer surface of the base body 4a.

Elastic Layer

Figure 2B:
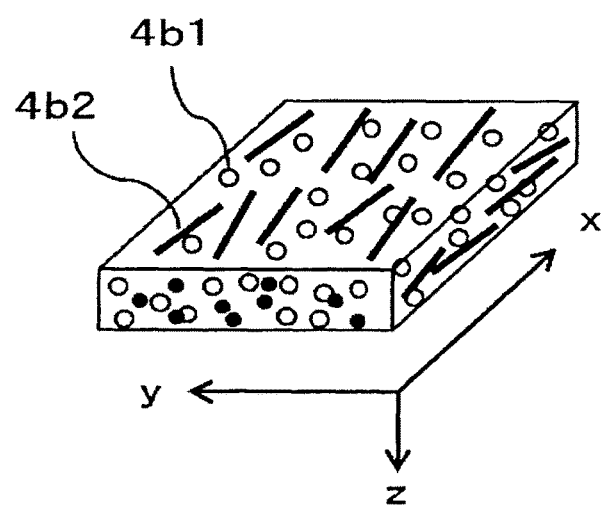
FIG. 2B is an enlarged perspective view of a sample cut off from an elastic layer.

FIG. 2B is a schematic enlarged perspective view of a sample S cut off from the elastic layer 4b of the pressing roller 4. The elastic layer 4b is a porous silicone rubber layer coating the outer periphery of the base body 4a serving as a rubber elastic member including pore portions, and many pores 4b1 serving as pore portions are defined therein to form a porous structure. As a result of the pores 4b1, the heat capacity of the elastic layer 4b is reduced, and the thermal conductivity of the elastic layer 4b in the thickness direction z is also reduced as compared with a case where no pore is defined.

The porous structure is preferably a continuous porous structure in which the pores 4b1 are connected to each other. Further, it is preferable that the ratio of the pore portions in the continuous porous structure of the elastic layer 4b is 40 vol % to 60 vol %.

Figure 3:
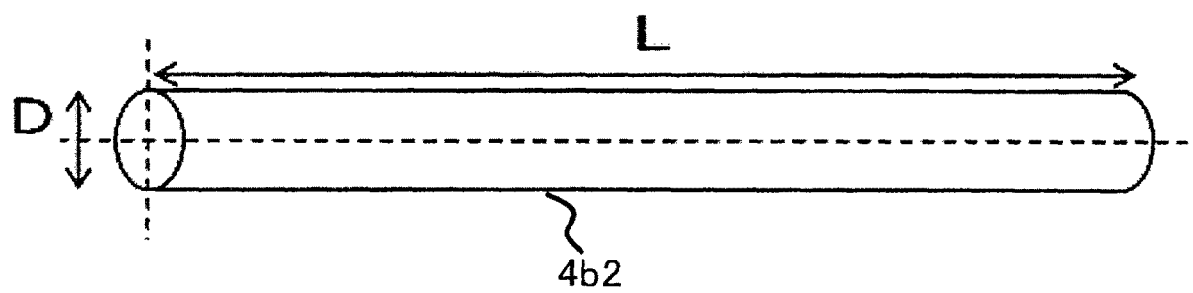
FIG. 3 is a schematic view of needle-shaped filler.

It is preferable that a liquid silicone rubber is used for the elastic layer 4b similarly to the film elastic layer 3b of the film 3. High-thermal-conductivity filler 4b2 having a needle shape, that is, a thin and long fiber-like shape as schematically illustrated in FIG. 3 is mixed and dispersed in the elastic layer 4b in a state of being oriented in the axial direction, that is, the x direction of FIG. 2A, and the circumferential direction, that is, the y direction of FIG. 2A. The needle-shaped high-thermal-conductivity filler 4b2 will be hereinafter simply referred to as needle-shaped filler 4b2.

The needle-shaped filler 4b2 will be described. As the needle-shaped filler 4b2, pitch-based carbon fiber having a thermal conductivity of 500 W/(m·K) or higher in the longitudinal direction of the filler is used. Pitch-based carbon fiber is carbon fiber manufactured from "pitch", which is a refinement byproduct of petroleum or dry distillation byproduct of coal, and hardly has thermal expansion while having high thermal conductivity and electrical conductivity. The needle-shaped filler 4b2 is a member having a thin and long columnar or prismatic rod shape whose ratio of length to the diameter is high, that is, whose aspect ratio is high.

As described above, the needle-shaped filler 4b2 preferably has an aspect ratio of 4.5 to 200. In addition, the needle-shaped filler 4b2 preferably has a thermal conductivity of 500 W/(m·K) in the longitudinal direction thereof.

Further, the needle-shaped filler 4b2 has thermal conductivity anisotropy which is a characteristic that the needle-shaped filler 4b2 more easily transmits heat in the direction in which the needle-shaped filler 4b2 is oriented, that is, a characteristic that the thermal conductivity of the needle-shaped filler 4b2 is higher in the major axis direction or the length direction. The needle shape refers to a shape that is long in only one direction as compared with the other directions, and the shape thereof can be expressed mainly by a minor axis diameter D and a major axis length L as illustrated in FIG. 3. Although the minor axis diameter D is not particularly limited, needle-shaped filler having an average minor axis diameter D of 5 μm to 15 μm can be relatively easily used. In addition, the average major axis length L is preferably 0.05 mm to 5 mm and more preferably 0.1 mm to 0.5 mm.

In the present exemplary embodiment, the elastic layer 4b is formed such that the thermal conductivity in the in-plane direction, that is, in the direction of x-y plane is higher than the thermal conductivity in the thickness direction z. Particularly, the thermal conductivity in the longitudinal direction x and the thermal conductivity in the circumferential direction y are set to be high. More specifically, the thermal conductivity in the longitudinal direction x and the thermal conductivity in the circumferential direction y are higher than the thermal conductivity in the thickness direction z by about 6 times to 20 times.

As a result of this, when sheets are successively passed through the fixing apparatus 10 and the temperature of a non-sheet passing portion serving as a non-recording material passing portion starts to rise, heat of the non-sheet passing portion is likely to be transmitted to a sheet passing portion serving as a recording material passing portion and the both end portion side of the pressing roller whose temperature is relatively lower than the non-sheet passing portion. Therefore, heat of the non-sheet passing portion of the fixing apparatus can be efficiently dissipated.

Various methods are known as methods for forming the pore portions 4b1, and in a pressing roller manufacturing step that will be described later, water which flows together with the base polymer and the needle-shaped filler and does not interrupt the orientation of the needle-shaped filler is preferably used.

Water dispersed in a sponge-forming liquid silicone rubber composition, which is obtained by dispersing water in an addition-curing liquid silicone rubber composition that is a mixture of a base polymer, a cross-linking agent, and other additives is removed in the manufacturing process, and pore portions are formed in the elastic layer after removing the water. The water is not singly dispersed in the base polymer, and is used in a state of swelling a water-absorbing polymer, a clay mineral, or the like that does not affect the characteristics of the elastic layer after water removal, that is, in the shape of a "water-containing gel".

The water-containing gel, the base polymer, the needle-shaped filler, and so forth are mixed and stirred after adding an emulsifier and a viscosity adjuster as necessary, and an emulsion of the sponge-forming liquid silicone rubber composition, that is, a liquid rubber composition containing water is prepared. Here, it is preferable that the ratio of water in the liquid rubber composition is 40 vol % to 60 vol %.

By injecting this into a casting mold and performing curing at a temperature at which water does not evaporate, an elastic member in which water in the liquid rubber composition is uniformly and finely dispersed can be formed. Then, by evaporating, that is, removing the water from the elastic member, an elastic layer in which fine pores are uniformly defined, that is, which has a continuous porous structure in which pore portions are connected to each other can be formed.

Examples of the water-absorbing polymer include polymers of acrylic acid, methacrylic acid, and metal salts of these, and copolymers and cross-linked bodies of these. Among these, alkali metal salts of polyacrylic acid and cross-linked bodies thereof can be suitably used and are industrially easily available. Examples of this include "RHEOGIC 250H", which is a product name of Toagosei.

In addition, using "water swelling a clay mineral" having a thickening effect is suitable for preparing an emulsified elastic layer-forming liquid composition. Examples of such a clay mineral include "BENGEL W-200U", which is a product name of HOJUN Co., Ltd. In addition, a surfactant such as a nonionic surfactant like sorbitan fatty acid ester "IONET HLB 4.3", which is a product name of Sanyo Chemical Industries, Ltd. may be added as an additive for emulsification.

The size of a pore portion 4b1 in the elastic layer 4b is preferably within a range from 5 μm to 30 μm from the viewpoint of strength and image quality. In addition, the volume occupancy ratio of the pore portions 4b1 in the elastic layer 4b is preferably 40 vol % or higher to achieve an expected effect of shortening the warm-up time. The volume occupancy ratio of the pore portions 4b1 in the elastic layer 4b will be hereinafter referred to as a pore ratio. In addition, to maintain the state in which the water in the liquid rubber composition is uniformly and finely dispersed in the process of forming the elastic layer and thus form an elastic layer including fine pore portions 4b1, the pore ratio is preferably 50 vol % or higher.

The pore portions 4b1 of the elastic layer 4b of the pressing roller 4 further have the following features. That is, when independent pores 4b1 of a certain threshold value or larger are extracted by three-dimensional image processing of an elastic layer sample S cut off from the elastic layer 4b as illustrated in FIG. 2B, major axis direction vectors of the pores 4b1 have angles with respect to the rotation axis direction, that is, the longitudinal direction x.

Figure 4:
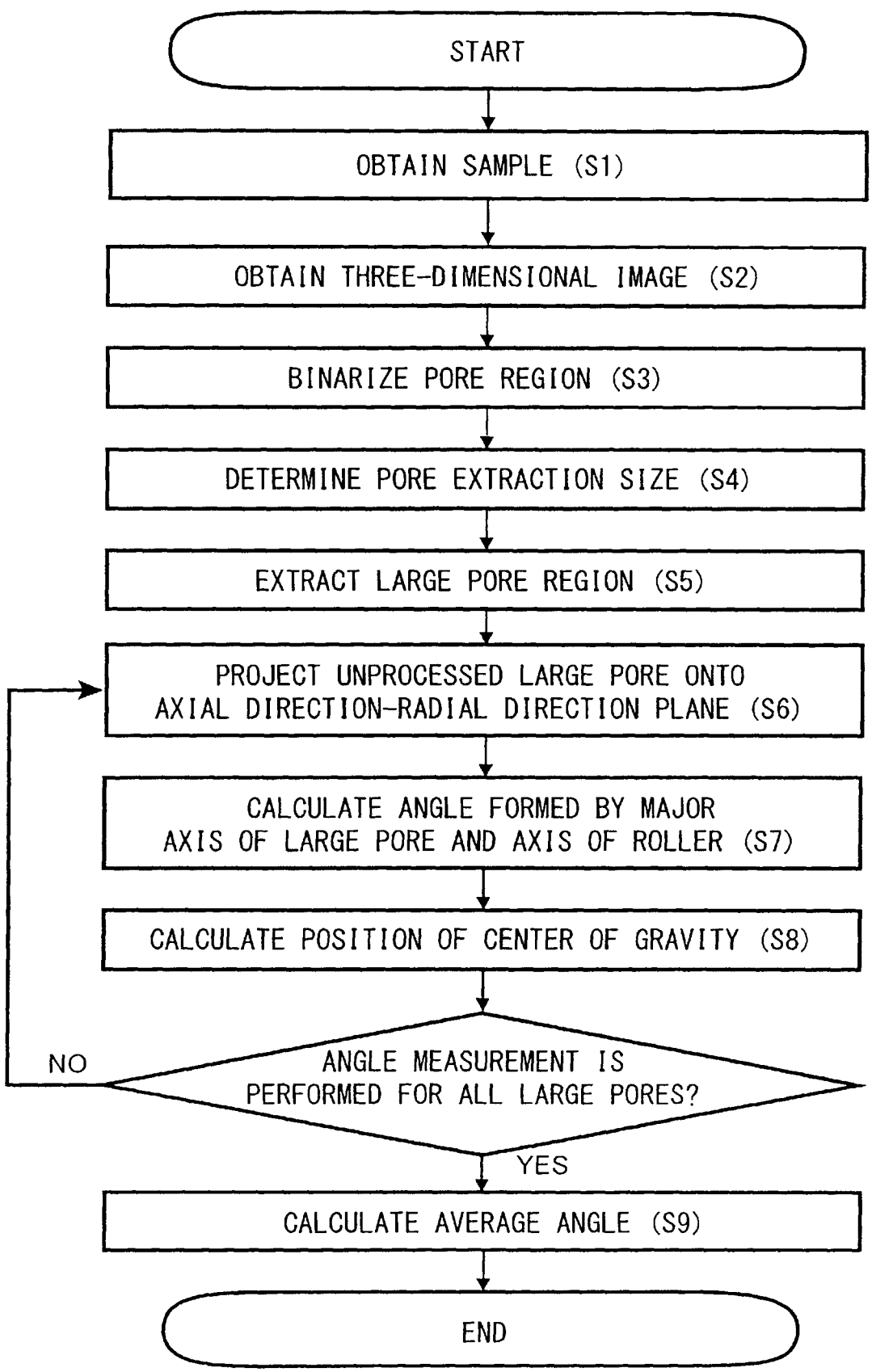
FIG. 4 is an analysis flowchart for defining the structure of pore portions in the elastic layer.
Figure 5:
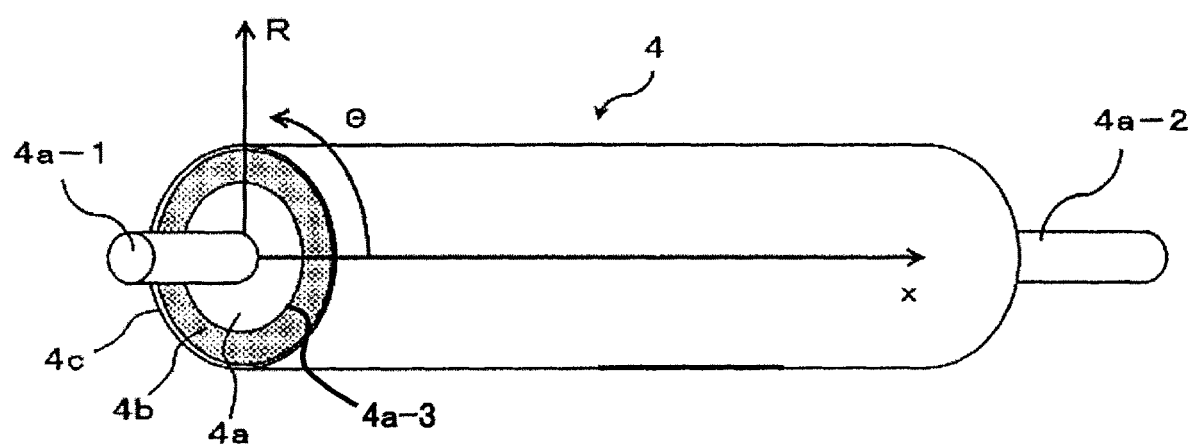
FIG. 5 is an explanatory diagram of an angle formed by a major axis direction vector of a pore and an axis of a pressing member.

How the angles formed by the major axis direction vectors of pores and the rotation axis direction are defined will be described. FIG. 4 is a flowchart illustrating an evaluation method. Description will be given below in the order of the flowchart of FIG. 4 by using a cylindrical coordinates system of FIG. 5.

First, the measurement sample S of the elastic layer 4b is obtained from the elastic layer 4b of the pressing roller 4 in step S1. Measurement samples are obtained in at least three positions in the X direction such that the surface on the base body side to the surface on the releasing layer side of the elastic layer 4b in the R direction are included and the measurement samples are not obtained in a single position.

Next, a three-dimensional image of the measurement sample S is obtained in step S2. The three-dimensional image needs to have a contrast between the pores 4b1 and the base material, which is silicone rubber in this case, and have a sufficient resolution for the size of the pores 4b1, and is obtained by measurement using, for example, X-ray computed tomography: X-ray CT. Here, it is preferable that the sample S is placed skillfully or the image is rotated such that the x and y axes of the obtained three-dimensional image coincide with R and X axes of the obtained sample S.

Figure 6A:
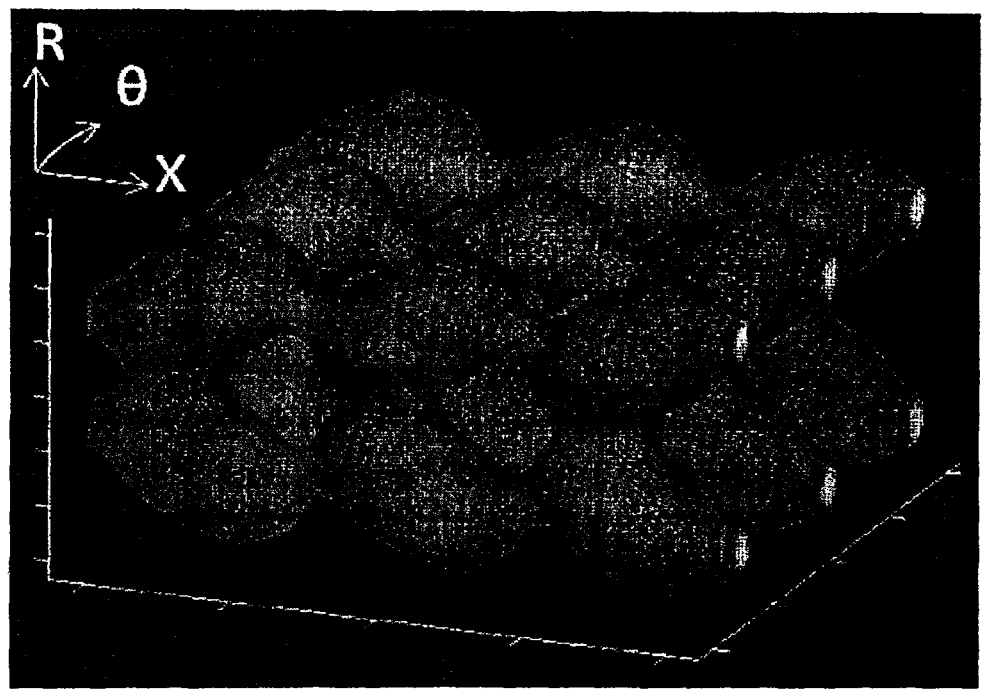
FIG. 6A is a model diagram illustrating an open cell structure of pores.

Next, a pore region and a base material region are binarized on the basis of the contrast of luminance values of the obtained three-dimensional image in step S3 of generating a binary image. At this time, the pore region is set to 1, which is represented by white, and the base material region is set to 0, which is represented by black. For the binarization, a method such as the Otsu's method is used. The pore region obtained here is a connected pore in which almost all pores are connected as illustrated in FIG. 6A. To obtain the major axis vectors of the pores that will be described later, only a large pore region, which is a region corresponding to local large cavities in the pore region, is extracted.

First, the size of the pores to be extracted is determined by the following method in step S4. Opening processing using a sphere having a diameter of 2 voxels as a structuring element is performed on the binary image, and then labeling processing or the like is performed to count the number of independent pore regions. This process is repetitively performed while increasing the diameter of the sphere serving as the structuring element, and thus the relationship between an extracted pore size serving as a pore diameter and the number of independent pores is obtained. To be noted, by the opening processing using a sphere as a structuring element, regions having diameters larger than that of the sphere serving as the structuring element can be extracted. In this regard, the diameter of the sphere serving as the structuring element can be also referred to as a threshold value for extraction by the opening processing.

That is, a binary image is generated from the three-dimensional image of the elastic layer 4b as described above, a threshold value X μm used when performing opening processing with which the number of pores derived from the pore portions takes the maximum value on the binary image is obtained.

Figure 6B:
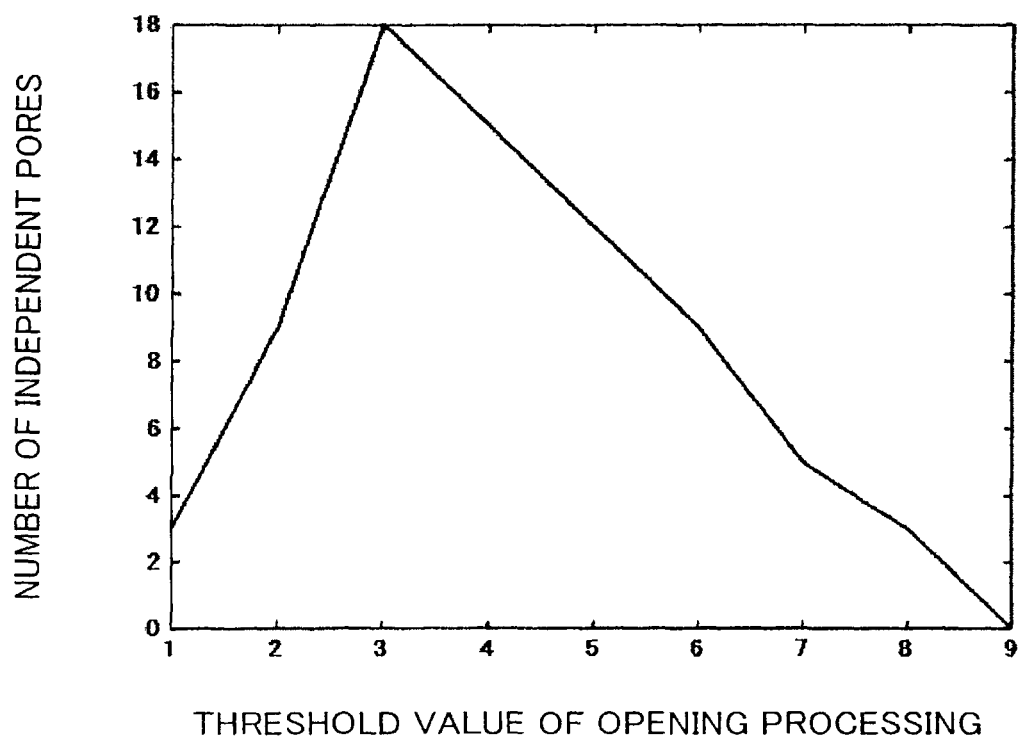
FIG. 6B is a graph illustrating a relationship between a threshold value of opening processing and the number of independent pores.

As illustrated in FIG. 6B, when the threshold value is small, the number of individual pores is small because many pores are connected. However, when the threshold value is increased, pores are separated and the number of independent pores increases, and when the threshold value is further increased, more pore regions are eliminated, and thus the number of independent pores is reduced. As described above, there is a maximum value for the number of independent pores, and a value that is twice the threshold value X μm of the opening processing with which the number of the independent pores takes the maximum value, that is, 2X μm is determined as a threshold value of the diameter of pores to be extracted. The value 2X μm is used as a threshold value for extraction to reduce noises.

Figure 6C:
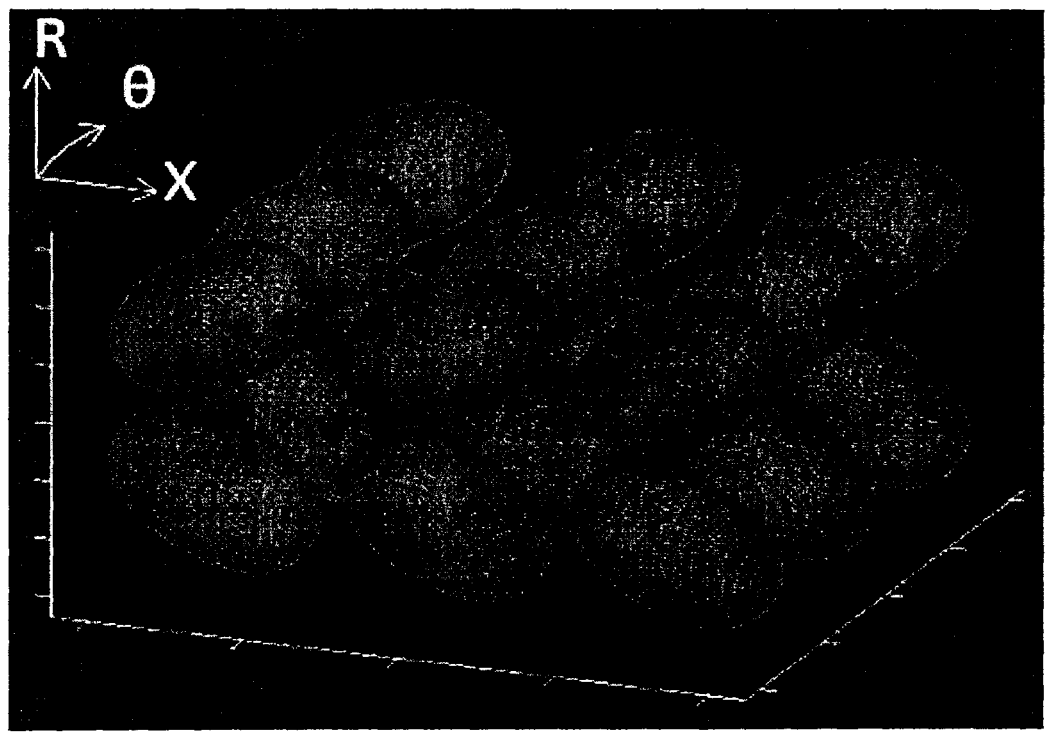
FIG. 6C is a model diagram illustrating a state in which independent large pores are extracted.

Next, opening processing is performed on the binary image obtained in step S3 by using the determined threshold value 2X μm, and thus a large pore region is extracted in step S5. By this processing, as illustrated in FIG. 6C, independent large pores are extracted from the connected pores.

Figure 6D:
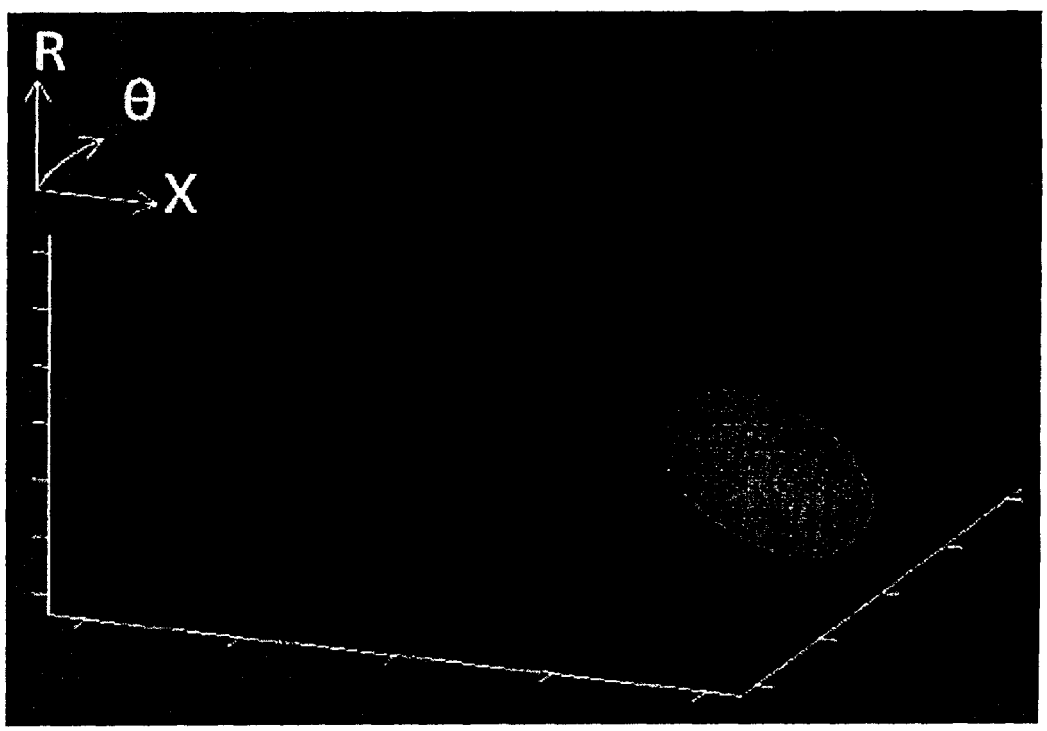
FIG. 6D is a model diagram of a focused large pore.
Figure 6E:
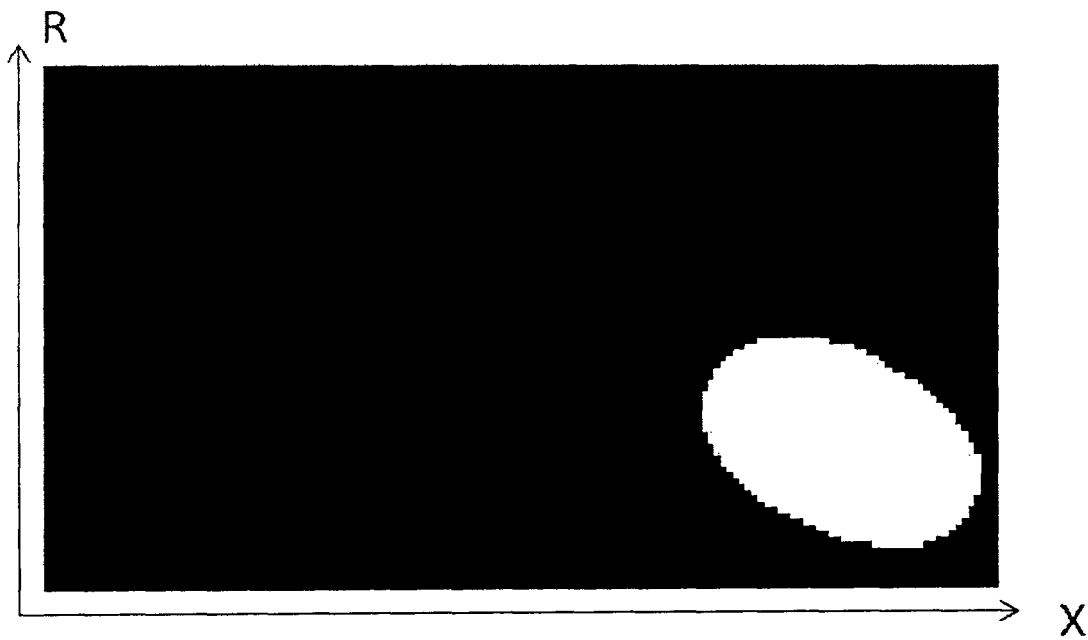
FIG. 6E is a projection diagram of the large pore of FIG. 6D projected onto an R-X plane by maximum intensity projection.

Next, focusing on a certain large pore, the large pore is projected onto an R-X plane in step S6. As the projecting method, maximum intensity projection of projecting the maximum value in a Θ direction is used. Images of the large pore before and after projection are shown in FIGS. 6D and 6E.

Figure 6F:
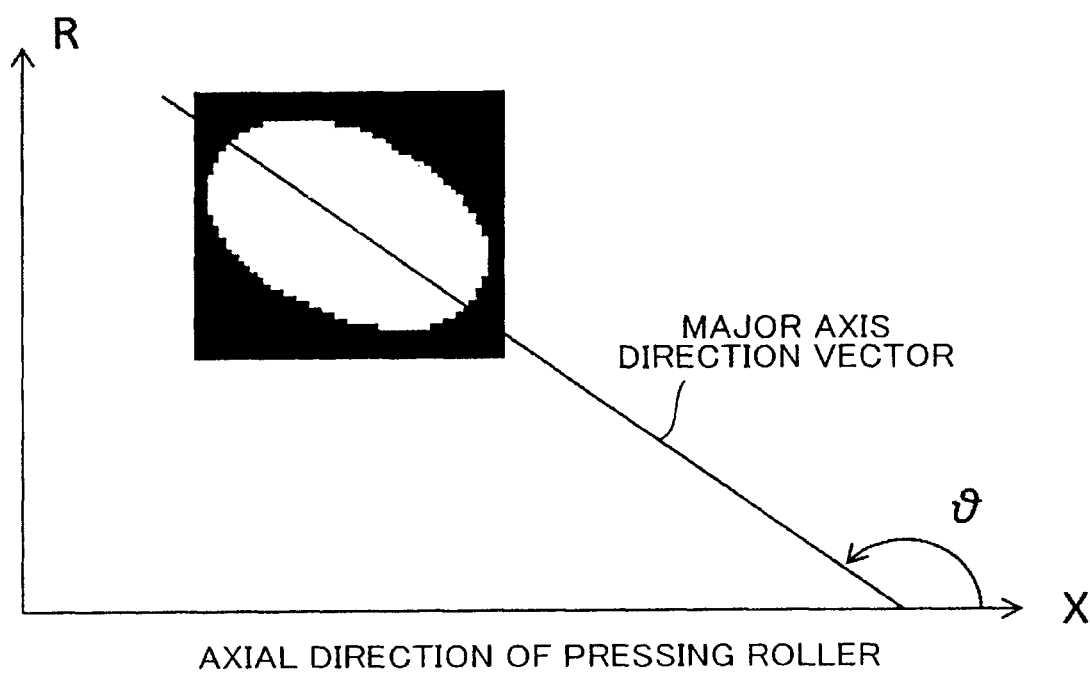
FIG. 6F is an explanatory diagram of an angle of a major axis direction vector of the projected large pore with respect to an axis of a pressing roller.

Next, regarding the projected large pore, the angle of the major axis direction vector with respect to the axis of the pressing roller 4 is calculated in step S7. The calculation of the major axis direction vector is performed by a method using a moment of the image. The direction of the axis of the pressing roller 4, that is, the longitudinal direction x is the same as the X-axis direction in the R-X plane, and the rotational driving shaft 4a-2 side is set as the positive side, that is, 0° side of the x axis of the pressing roller 4. At this time, regarding the angle of the major axis direction vector with respect to the axis of the pressing roller 4, an angle formed in the counterclockwise direction from the x axis with respect to the positive side, that is, 0° side of the x-axis direction is set as θ as illustrated in FIG. 6F.

Therefore, the angle of the major axis direction vector of each large pore with respect to the axis of the pressing member is in the range between 0° and 180°. To be noted, since component forces derived from the anisotropic deformation described above are not generated in the case of 0° or 180° and thus the influence on the eccentricity of the film is considered to be small, 0° and 180° are not included in the range of the angle of the major axis direction vector.

Next, the position of the center of gravity of the projected large pore is calculated in step S8. Although a single value of the position of the center of gravity is determined by using any method, it is preferable that the position of the center of gravity is calculated by a method using the moment of the image. The processing of steps S6 to S8 is performed on all the large pores, and the process proceeds to step S9 after finishing the processing.

Finally, an average value of angles of major axis direction vectors of large pores with respect to the axis of the pressing roller 4 is calculated in step S9.

As described above, opening processing is performed on the binary image with the threshold value of 2X μm, and thus pores derived from the pore portions in the elastic layer 4b are extracted. A line segment defining the maximum length of each pore included in the pores projected onto the section of the elastic layer 4b taken along the longitudinal direction of the base body 4a is defined as the major axis direction vector of each pore of the pores. In addition, the angle of the major axis direction vector with respect to the longitudinal direction of the base body 4a in the projection plane after the projection is set as the angle θ.

Although the thickness of the elastic layer 4b is not particularly limited as long as the nip portion N of a desired width can be formed in the sheet conveyance direction A when the entirety of the elastic layer comes into contact with the film 3 and is elastically deformed, the thickness is preferably 1. 5 mm to 10. 0 mm. The hardness of the elastic layer 4b is preferably 20° to 70° from the viewpoint of securing the nip portion N of a desired width.

Releasing Layer

The releasing layer 4c is a fluorine resin layer. The releasing layer 4c is formed by, for example, covering the outer periphery of the elastic layer 4b by a tube of tetrafluoroethylene-perfluoroalkyl vinyl ether copolymer: PFA. This tube will be also referred to as a fluorine-based resin tube or a PFA resin tube.

Alternatively, the releasing layer 4c may be formed by applying a paint containing a fluorine resin such as PFA, polytetrafluoroethylene: PTFE, or tetrafluoroethylene-hexafluoropropylene copolymer: FEP on the outer periphery of the elastic layer 4b.

Although the thickness of the releasing layer 4c is not particularly limited, the thickness is preferably about 15 μm to 80 μm. The releasing layer 4c is provided to make toner less likely to attach to the pressing roller 4.

To be noted, a primer layer, a bonding layer, or the like may be provided between the elastic layer 4b and the releasing layer 4c for the purpose of bonding, electrical conduction, or the like.

Formation Method for Elastic Layer

Next, a formation method for the elastic layer 4b and a formation method for the releasing layer 4c will be described.

(1) Preparation of Sponge-Forming Silicone Rubber Composition

The needle-shaped filler 4b2 and the water-containing gel obtained by absorbing water in the water-absorbing polymer are mixed with the liquid silicone rubber that is not cross-linked. As a result of this, the sponge-forming liquid silicone rubber composition is prepared. This composition is an emulsion composition containing the liquid silicone rubber and water, and hereinafter referred to as a liquid rubber composition. This liquid rubber composition may be prepared by weighing a predetermined amount of each of the liquid silicone rubber, the needle-shaped filler 4b2, and the water-containing material and stirring these by a known filler-mixing stirring apparatus such as a universal mixing and stirring machine of a planetary type.

Figure 7:
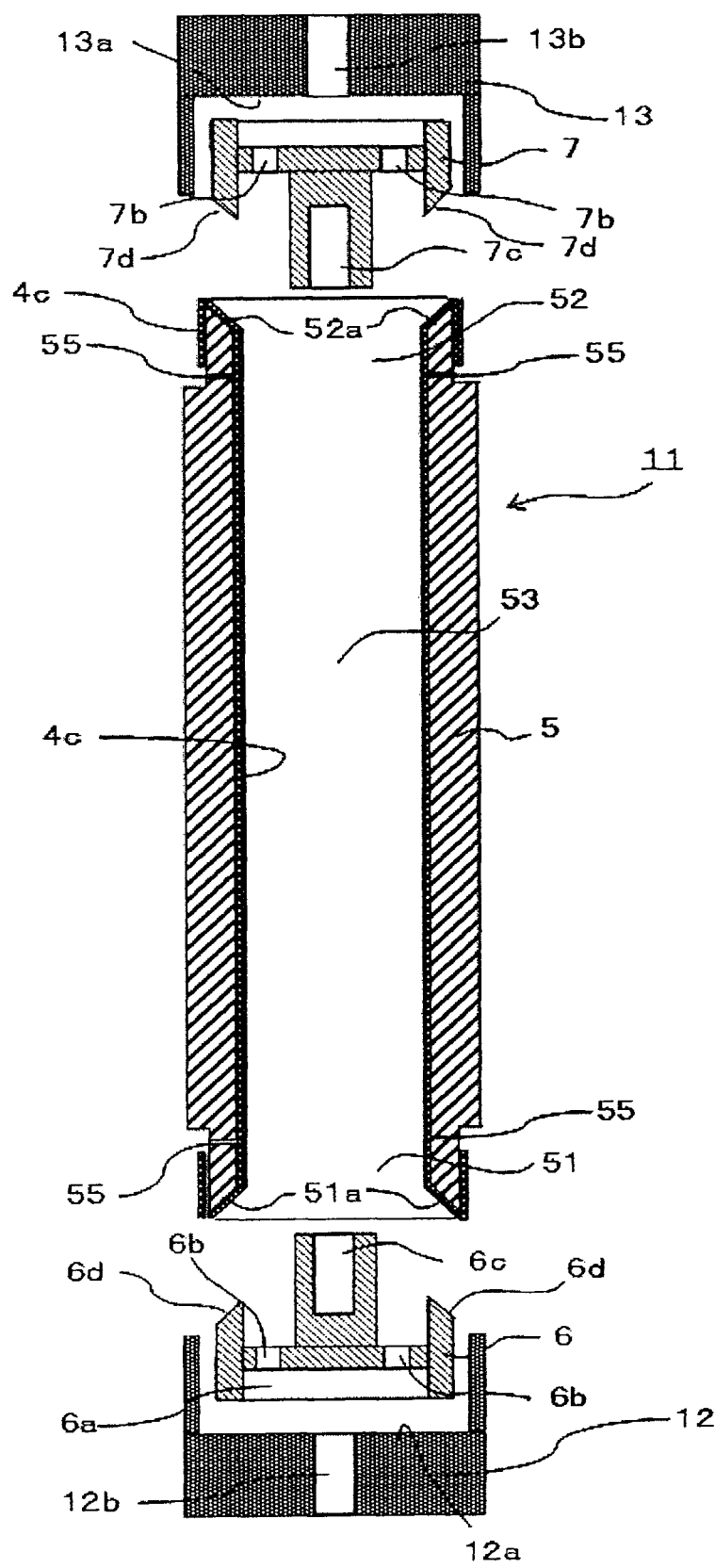
FIG. 7 is an explanatory diagram of a configuration of a mold.

(2) Formation of Elastic Layer 4b Using Sponge-Forming Silicone Rubber Composition (2-1) Mold The formation method for the elastic layer 4b will be described by taking manufacture by casting as an example. FIG. 7 is a longitudinal section view of a hollow mold 5, an inner mold piece 6 and an outer mold piece 12 on the first end side thereof, and an inner mold piece 7 and an outer mold piece 13 on the second end side thereof constituting a mold 11. This mold 11 is a mold capable of holding the base body 4a of the pressing roller 4 serving as a fixing member therein, that is, in a molding space thereof.

The mold 11 includes the hollow mold 5 including a columnar molding space 53 and the first end inner mold piece 6 and the second end inner mold piece 7 respectively mounted on a first end opening portion 51 and a second end opening portion 52 of the hollow mold 5. The molding space will be hereinafter referred to as a cavity. The hollow mold 5 will be also referred to as a hollow cylindrical mold or a pipe-shaped mold.

The first end inner mold piece 6 is a mold piece for injecting the liquid rubber composition into the cavity 53 of the hollow mold 5. The second end inner mold piece 7 is a mold piece for exhausting air pushed out of the cavity 53 by the injection of the liquid rubber composition into the cavity 53.

Figure 8A:
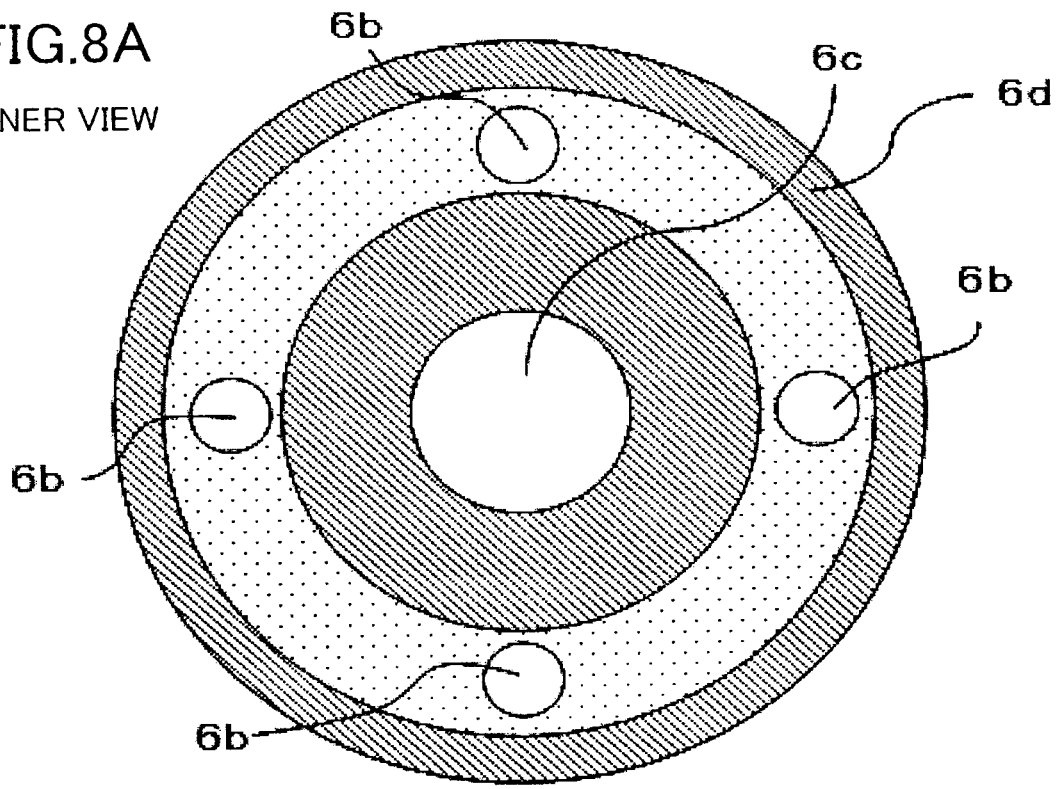
FIG. 8A is an inner view of injection ports provided in a first end mold piece.
Figure 8B:
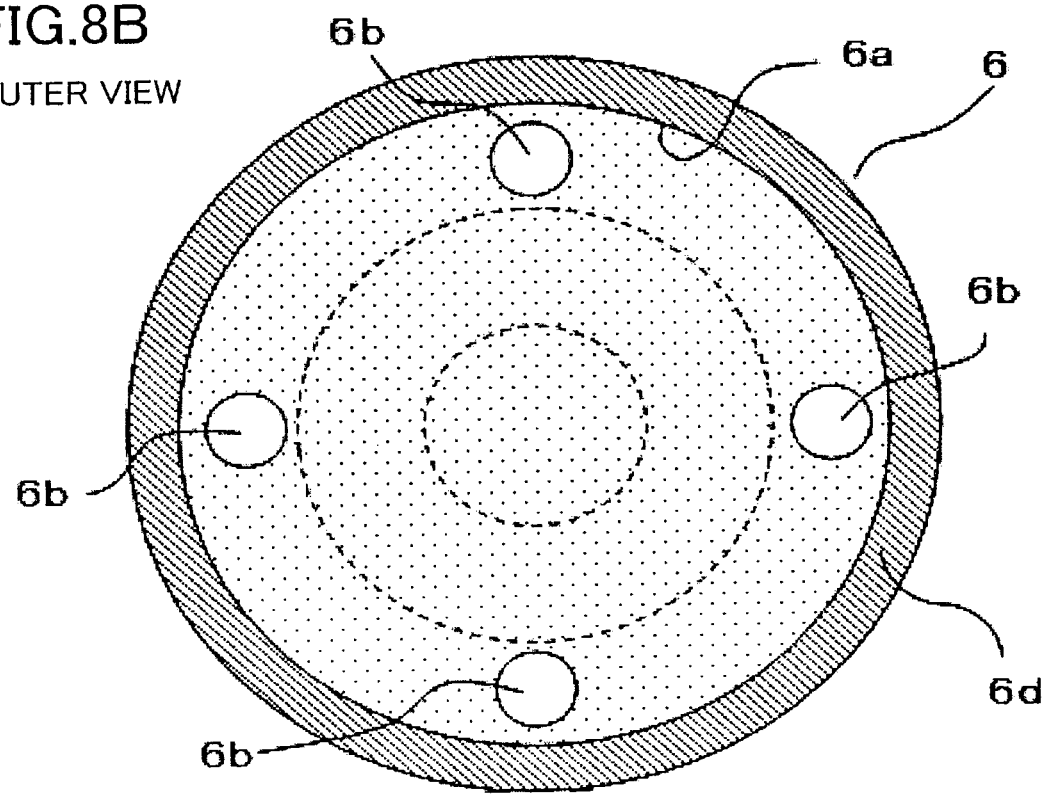
FIG. 8B is an outer view of the injection ports provided in the first end mold piece.

FIG. 8A is an inner view, that is, an end surface view on the cavity side, of the first end inner mold piece 6, and FIG. 8B is an outer view, that is, an end surface view on the opposite side to the cavity, of the first end inner mold piece 6. Referring the FIGS. 7 to 8B, a center hole 6c serving as a base body holding portion in which the small-diameter shaft portion 4a-1 on the first end side of the base body 4a is to be inserted is provided at the center portion on the inner surface side of the first end inner mold piece 6. In addition, a circumferential hole 6a that is a hollow portion or a recess portion is provided on the outer surface side. Further, a plurality of liquid rubber composition injection ports 6b penetrating from the outer surface side to the inner surface side are bored in the circumferential hole 6a along the circumference.

In addition, referring to FIG. 7, a center hole 7c serving as a base body holding portion in which the small-diameter shaft portion 4a-2 on the second end side of the base body 4a is to be inserted is provided in a center portion on the inner surface side, that is, in a center portion of an end surface on the cavity side, of the second end inner mold piece 7. Further, a plurality of air exhaustion ports 7b penetrating from the inner surface side to the outer surface side are bored.

The first end inner mold piece 6 is fit in the first end opening portion 51 of the hollow mold 5 first from the inner surface side and sufficiently inserted until a circumferential edge portion 6d on the inner surface side abuts and is received by a ring-like step portion 51a of the inner peripheral surface of the opening portion, and thus the first end inner mold piece 6 is mounted on the first end side of the hollow mold 5.

In addition, the second end inner mold piece 7 is fit in the second end opening portion 52 of the hollow mold 5 first from the inner surface side and sufficiently inserted until a circumferential edge portion 7d on the inner surface side abuts and is received by a ring-like step portion 52a of the inner peripheral surface of the opening portion, and thus the second end inner mold piece 7 is mounted on the second end side of the hollow mold 5.

(2-2) Placing Base Body in Mold

A primer for silicone rubber is applied in advance on a portion of the base body 4a on which the rubber elastic layer 4b is to be formed, and the base body 4a is subjected to baking treatment in a hot air circulation oven. As illustrated in FIG. 9A, the first end inner mold piece 6 is mounted on the first end opening portion 51 of the hollow mold 5. Then, as illustrated in FIG. 9B, the base body 4a described above is inserted through the second end opening portion 52 of the hollow mold 5 first from the small-diameter shaft portion 4a-1 on the first end side such that the small-diameter shaft portion 4a-1 is inserted in and supported by the center hole 6c on the inner surface side of the first end inner mold piece 6.

Next, as illustrated in FIG. 9C, the second end inner mold piece 7 is mounted on the second end opening portion 52 of the hollow mold 5 in a state in which the small-diameter shaft portion 4a-2 on the second end side of the base body 4a is inserted in and supported by the center hole 7c on the inner surface side of the second end inner mold piece 7.

As a result of this, the small-diameter shaft portions 4a-1 and 4a-2 on the first end side and the second end side of the base body 4a are respectively supported by the center holes 6c and 7c of the first end inner mold piece 6 and the second end inner mold piece 7, and thus the base body 4a is concentrically positioned and held at a center portion of the columnar cavity 53 of the hollow mold 5. In addition, a gap 8 for cast molding of the rubber elastic layer 4b of a predetermined thickness on the outer periphery of the base body 4a is defined between the columnar molding surface 53a, that is, the inner peripheral surface of the columnar cavity 53 and the outer surface 4a-3, that is, the outer peripheral surface of the base body 4a.

To be noted, placement of the base body 4a in the cavity 53 of the mold 11 is not limited to the procedure described above as long as the hollow mold 5, the base body 4a, the first end inner mold piece 6, and the second end inner mold piece 7 are assembled as illustrated in FIG. 9C in the end.

(2-3) Casting of Sponge-Forming Silicone Rubber Composition

Figure 10:
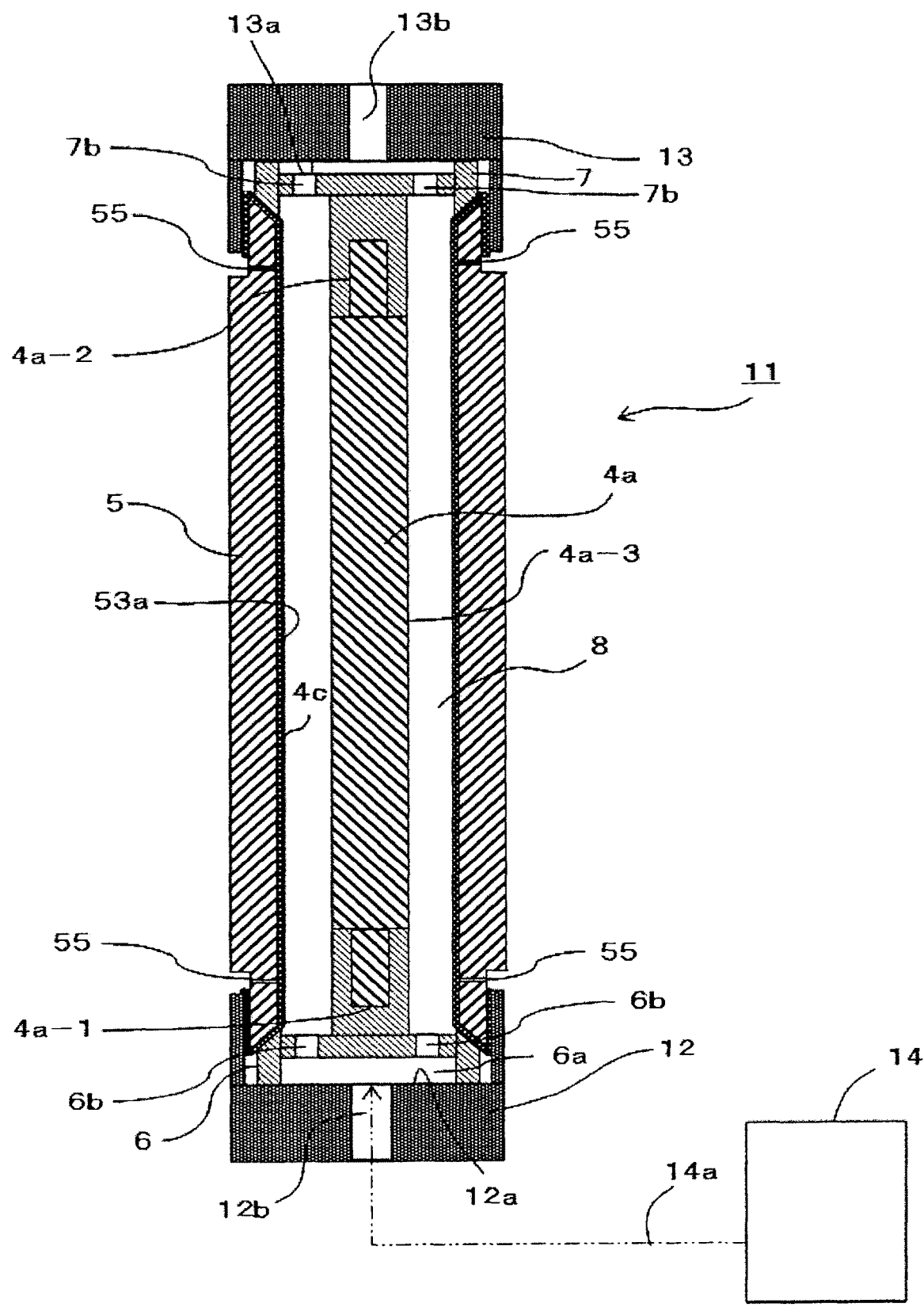
FIG. 10 is a schematic section view of the mold in an assembled state.

The mold 11 including the base body 4a placed in the cavity 53 as described above is clamped and thus held in a fixed state in a vertical orientation between the lower outer mold piece 12 and the upper outer mold piece 13 that are opposed to each other with the first end inner mold piece 6 on the lower side and the second end inner mold piece 7 on the upper side as illustrated in FIG. 10. The first end inner mold piece 6 side of the mold 11 is fit in and received by a receiving hole 12*a* of the lower outer mold piece 12. The second end inner mold piece 7 side of the mold 11 is fit in and received by a receiving hole 13*a* of the upper outer mold piece 13. The first end inner mold piece 6 will be hereinafter also referred to as a lower inner mold piece 6, and the second end inner mold piece 7 will be hereinafter also referred to as an upper inner mold piece 7.

Here, in the present exemplary embodiment, the first end inner mold piece 6 and the lower outer mold piece 12 serve as mold terminal members on the first end side of the mold 11, and the second end inner mold piece 7 and the upper outer mold piece 13 serve as mold terminal members on the second end side of the mold 11.

That is, the mold 11 is fixed and held between the lower outer mold piece 12 and the upper outer mold piece 13 in such an orientation that the columnar axis of the columnar cavity 53 is in the vertical direction and the side on which the injection ports 6*b* are provided is positioned on the lower side, and a casting step is performed in this state.

A liquid rubber injection port 12*b* is bored in a center portion of the receiving hole 12*a* of the lower outer mold piece 12. The liquid rubber injection port 12*b* is connected to a liquid silicone rubber composition supplying tube 14*a* of a liquid silicone rubber composition supplying apparatus 14 on the outside. An exhaustion port 13*b* is bored in a center portion of the receiving hole 13*a* of the upper outer mold piece 13.

As a result of driving the liquid silicone rubber composition supplying apparatus 14, the liquid rubber composition described in the section (1) above enters the receiving hole 12*a* through the supplying tube 14*a* and the injection port 12*b* of the lower outer mold piece 12. Thus, the liquid rubber composition is injected into a space portion defined by the receiving hole 12*a* and the circumferential hole 6*a* on the outer surface side of the lower inner mold piece 6.

By the continuing supply of the liquid rubber composition, the injected liquid rubber composition flows from the outer surface side to the inner surface side of the lower inner mold piece 6 through the plurality of injection ports 6*b* bored along the circumference of the circumferential hole 6*a*. Thus, the liquid rubber composition is injected into the gap 8 defined between the columnar molding surface 53*a* of the cavity 53 and the outer surface 4*a*-3 of the base body 4*a*.

Further, by the continuing supply of the liquid rubber composition, the injection of the liquid rubber composition into the gap 8 progresses from the lower side to the upper side. Air in the gap 8 is pushed up from the lower side to the upper side in the gap 8 by the injection of the liquid rubber composition into the gap 8 from the lower side to the upper side, and thus is exhausted from the gap 8 to the outside of the mold 11 through the exhaustion ports 7*b* of the upper inner mold piece 7 and the exhaustion port 13*b* of the upper outer mold piece 13.

The liquid rubber composition is injected into the gap 8 through the injection ports 6*b* of the lower inner mold piece 6 evenly in the circumferential direction of the gap 8. Further, since the base body 4*a* is concentrically fixed in the columnar center portion of the cavity 53 by the upper and lower inner mold pieces 6 and 7 and is thus not moved by the injection of the liquid rubber composition, the gap 8 can be sufficiently filled with the liquid rubber composition without occurrence of unevenness of thickness.

In the manner described above, the liquid rubber composition is injected into, that is, casted in the mold 11 along the axial direction of the base body 4*a* placed in the mold 11. When the liquid rubber composition is injected into the mold 11 along the axial direction of the base body 4*a*, most of the needle-shaped filler 4*b*2 is oriented in the axial direction of the base body 4*a*, that is, in the longitudinal direction of the pressing roller 4 serving as the x direction in accordance with the flow of the liquid rubber composition.

Therefore, the thermal conductivity of the elastic layer 4*b* becomes high in the longitudinal direction as compared with the other directions. In the case where the thermal conductivity in the longitudinal direction is higher than thermal conductivities in the other directions, the heat of the non-sheet passing portion can be efficiently dissipated. That is, when the temperature of the non-sheet passing portion serving as a non-recording material passing portion starts to rise during operation of the fixing apparatus 10, the heat of the non-sheet passing portion is easily transmitted from the non-sheet passing portion to the sheet passing portion serving as the recording material passing portion and the both end portion side of the pressing roller whose temperatures are relatively low. Therefore, heat of the non-sheet passing portion can be efficiently dissipated.

To be noted, even in the case where the liquid rubber composition is injected into the mold 11 along the axial direction of the base body 4*a*, the flow of the liquid rubber composition might become disordered in the mold 11 in some cases. In such a case, the liquid rubber composition also flows in the sheet conveyance direction, that is, the circumferential direction serving as the y direction, and in a direction crossing the circumferential direction, examples of which including the x direction.

Therefore, in the elastic layer 4*b*, although the needle-shaped filler 4*b*2 is mainly oriented in the longitudinal direction, part of the needle-shaped filler 4*b*2 is oriented in an in-plane direction along the x-y plane including the longitudinal direction and the circumferential direction. In this case, not only the thermal conductivity in the longitudinal direction x by also the thermal conductivity in the circumferential direction y increases. However, the increase in the thermal conductivity in the circumferential direction y is also effective for suppressing the rise of temperature of the non-sheet passing portion, that is, rise of temperature of the non-recording material passing portion, and therefore this is not problematic. That is, the needle-shaped filler 4*b*2 in the elastic layer 4*b* is effective for suppressing the rise of temperature of the non-sheet passing portion regardless of the orientation thereof as long as the orientation thereof is in an in-plane direction along the x-y plane.

The injection of the liquid rubber composition into the mold 11 is continued at least until the gap 8 is sufficiently filled with the liquid rubber composition. There is no need to sufficiently fill the exhaustion ports 7*b* of the upper inner mold piece 7 with the liquid rubber composition.

(2-4) Cross-linking Curing of Silicone Rubber Component

After casting the liquid rubber composition, that is, after finishing the casting step, the outer opening portions of the lower inner mold piece 6 and the upper inner mold piece 7, that is, the receiving holes 12*a* and 13*a* are sealed by attaching blind plates, fastening screws, and so forth such that the cast liquid rubber in the mold 11 does not flow out through the outer opening portions of the lower inner mold piece 6 and the upper inner mold piece 7. Then, the mold 11 is heated in the sealed state in a heat curing step of the liquid rubber composition.

At this time, the curing speed of the liquid rubber composition is varied between the upper side and the lower side by setting different values for the temperature to which the outer surfaces of the upper and lower outer mold pieces 12 and 13 are heated.

Figure 11:
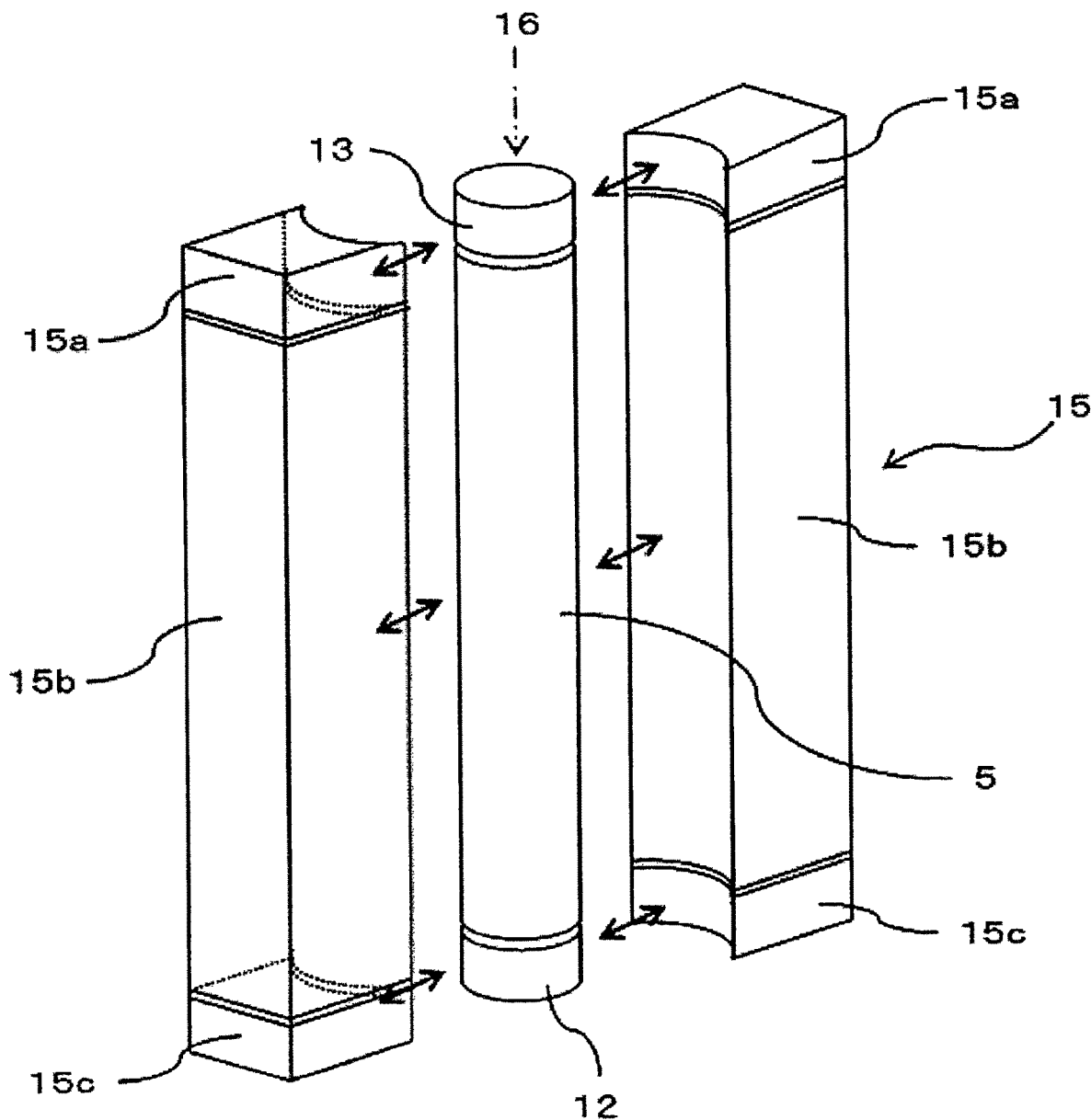
FIG. 11 is a perspective view of the mold and heating metal plates that clamp and heat the mold.

More specifically, a heating metal plate 15 that is divided into two in the circumferential direction and three in the longitudinal direction, disposed to sandwich the outer surface of the mold 11, and set to a predetermined heating temperature is prepared as illustrated in FIG. 11. Further, different temperatures are set for the three divided parts of 15a, 15b, and 15c in the longitudinal direction of the heating metal plate 15. As a result of this, the liquid rubber is cured while flowing in the mold, and therefore the emulsified and dispersed state of water after curing of the rubber, and then the pore portions, that is, connected holes after evaporating the water are formed to have appropriate orientation angles with respect to the rotation axis of the pressing roller.

In addition, the upper outer mold piece 13 is pressed from the upper side by a sufficient pressing force by a pressing apparatus 16 such as an oil pressure cylinder such that rubber does not leak through fitting portions between the upper and lower outer mold pieces 12 and 13 and the hollow mold 5 by the expanding pressure of the liquid rubber in the mold derived from heat.

The setting temperature of the heating plate is set to a value equal to or lower than the boiling point of water, for example, to 70° C. to 90° C. The heating time differs depending on the setting temperature, and is preferably 60 minutes to 100 minutes in the case of 70° C., and 5 minutes to 10 minutes in the case of 90° C. As described above, in the case where the liquid rubber composition is subjected to heat treatment in a sealed state, the silicone rubber component is cross-linked and cured while still holding the moisture of the water-containing material in the heat curing step.

More specifically, when heating and curing the rubber composition by heating the mold in the heat curing step, the difference in the heating temperature between the upper and lower outer mold pieces 12 and 13 is 5° C. to 10° C. Further, the average value of the heating temperatures of the upper and lower outer mold pieces 12 and 13 are 80° C. to 90° C. Then, after heating the upper and lower outer mold pieces 12 and 13 for a predetermined time, the heating is continued, and the mold portion between the upper and lower outer mold pieces 12 and 13 is heated for a predetermined time at an intermediate temperature between the heating temperatures of the upper and lower outer mold pieces 12 and 13.

(2-5) Formation of Pore Portions

After the cross-linking curing process described above, that is, after the heat curing step, the lower mold pieces 6 and 12 and the upper mold pieces 7 and 13 are detached from both end portions of the hollow mold 5 and thus both end portions of the hollow mold 5 are opened. In this state, a molded elastic roller in the hollow mold 5 is heated by heating the hollow mold 5 to a predetermined high temperature.

The detachment of the lower inner mold piece 6 and the upper inner mold piece 7 from the hollow mold 5 described above is performed by pulling out these respectively through the first end opening portion 51 and the second end opening portion 52 of the hollow mold 5. This detachment is performed against the bonding force of a joining portion or a bonding portion between end surfaces of the cured rubber layer of the elastic roller in the hollow mold 5 and the cured rubber layer in the holes 6b and 7b of the lower inner mold piece 6 and the upper inner mold piece 7.

Since the moisture contained in the water-containing material evaporates as the temperature inside the elastic layer 4b is increased by the heating described above, the pore portions 4b1 are formed at portions corresponding to the moisture in a pore portion forming step. As a condition for heating the elastic roller 4 at this time, the heating temperature is set to 150° C. to 180° C.

For the heating, the center portion 15b of the heating metal plate 15 or the hot air circulation oven may be used. The heating time depends on the heating method and the heating temperature, and is preferably 50 minutes to 100 minutes in the case of the heating metal plate, and preferably 100 minutes to 200 minutes in the case of the hot air circulation oven. As described above, the elastic layer 4b including the pore portions 4b1 and the needle-shaped filler 4b2 is formed on the outer periphery of the base body 4a.

(2-6) Release of Porous Elastic Roller from Mold

After cooling the heated hollow mold 5 by a water cooling method or an air cooling method, the molded porous elastic roller, that is, the pressing roller 4 is released from the hollow mold 5. Then, a shape adjustment process of removing burrs and abnormal portions remaining on the first end surface and the second end surface of the elastic layer 4b is preformed as necessary on the porous elastic roller 4 released from the hollow mold 5. This porous elastic roller 4 is left to stand for 4 hours in a hot air circulation oven at 200° C., and thus the elastic layer 4b is subjected to secondary curing.

(2-7) Formation of Releasing Layer

The releasing layer 4c is formed by covering the elastic layer 4b by a fluorine resin tube. When covering with the fluorine resin tube, an adhesive is generally used. However, the fluorine resin tube can be adhered to the elastic layer 4b without using an adhesive in some cases, and an adhesive does not have to be used in such a case. In addition, the releasing layer 4c may be formed by, for example, applying a paint containing a fluorine resin on the outer periphery of the elastic layer 4b.

Alternatively, the releasing layer 4c may be formed together with the elastic layer 4b. That is, as illustrated in FIG. 7, the fluorine resin tube to serve as the releasing layer 4c is disposed on the inner surface of the hollow mold 5, that is, attached to the molding surface of the hollow mold 5. Then, the base body 4a is disposed in the hollow mold 5 as illustrated in FIGS. 9A to 9C. Then, by injecting the liquid rubber composition into the gap between the base body 4a and the fluorine resin tube 4c as illustrated in FIG. 10, and thus the elastic layer 4b is formed in a state in which the releasing layer 4c is formed. To be noted, as the fluorine resin tube 4c disposed in the mold, a fluorine resin tube having an inner surface which is etched and on which a primer has been applied and dried in advance is used.

In the description above, it is preferable that the fluorine resin tube 4c is firmly attached to the inner surface of the mold by vacuum suction performed by reducing the pressure between the inner surface 53a of the mold and the outer surface of the fluorine resin tube 4c before injecting the liquid silicone rubber composition into the gap between the inner surface of the fluorine resin tube 4c and the outer surface of the base body 4a. Suction holes 55 are provided in the hollow mold 5 for the vacuum suction described above.

Here, a mold releasing agent is applied on liquid contact surfaces of the lower mold pieces 6 and 12 and the upper mold pieces 7 and 13 in advance, and the lower mold pieces 6 and 12 and the upper mold pieces 7 and 13 are reused by performing a treatment of removing cured rubber remaining on the mold pieces after releasing the roller from the mold. In the case where the mold releasing agent is applied, the cured rubber remaining on the mold pieces can be easily removed. By also applying the mold releasing agent on the molding surface 53*a* of the hollow mold 5, the mold releasing after curing the rubber becomes easier.

In addition, in the casting step, the mold 11 may be oriented horizontally or vertically inverted. However, since there is a risk that air is mixed in the liquid rubber composition during injection in the horizontal orientation or the vertically inverted orientation, it is preferable that the injection side is disposed on the lower side.

Suppressing Damage of Edge Portion of Film

As described above, the film 3 that is rotated in accordance with the rotation of the rotationally driven pressing roller 4 is biasedly moved, and an edge portion thereof abuts a flange. The edge portion of the film 3 might wear, break, tear, or bend due to the load applied thereto at this time, and thus the film 3 might be damaged.

As a result of study on such a problem by the present inventors and so forth, the following has been found. That is, regarding the eccentricity of a film in a fixing apparatus including a pressing roller including a porous silicone rubber layer formed from a sponge-forming liquid silicone rubber composition, an elastic layer pressurized for forming a nip portion is anisotropically deformed in accordance with an orientation angle of connected pore portions thereof. It is considered that this anisotropic deformation generates component forces, and thus a film rotatably placed over the pressing roller moves in the rotation axis direction. This biasing force is generated independently from a biasing force generated by deviation of degree of parallel between the film 3 and the pressing roller 4.

Therefore, by intentionally setting the angle of the connected pores of the pressing roller 4, a biasing force can be generated by the anisotropic deformation of the pressing roller 4 in a direction cancelling a biased force derived from the deviation of degree of parallel that is caused by deviation derived from assembly of the fixing apparatus such as deviation of degree of parallel and warpage of fixing frames, which can be estimated in advance. As a result of this, the biasing force of the film can be reduced. That is, damage to the edge portion of the film can be suppressed, and thus the durability of the fixing apparatus can be improved.

Therefore, the fixing apparatus of the present exemplary embodiment has the following configuration. The fixing apparatus includes the endless film 3 and the pressing roller 4 that is in mutual pressure contact with the film 3 to form the nip portion N in which the sheet P bearing the image T is nipped, conveyed, and heated, and is rotationally driven to cause the film 3 to be rotated accordingly. The pressing roller 4 includes the base body 4*a* and an elastic layer formed on the base body 4*a*.

Further, the fixing apparatus is such an apparatus that, in the case where the pressing roller is a roller including a non-porous rubber layer not including a pore as the elastic layer, an urging force causing the film to be biased toward one end side in accordance with the rotational drive of the pressing roller is applied.

1) In such a fixing apparatus, the pressing roller 4 includes the elastic layer 4*b* including the pore portions 4*b*1 connected to each other, and is attached to the apparatus such that the orientation of the flat shape of the pore portions is opposite to the direction in which the film 3 is biasedly moved. That is, the orientation of the flat shape of the pore portions 4*b*1 is opposite to the direction of the biasing force applied to the film 3 in the case where the pressing roller 4 is not used.

2) More specifically, in the fixing apparatus described above, the pressing roller 4 includes the elastic layer 4*b* including the pore portions 4*b*1 connected to each other, wherein in the case where the film 3 is biased in the 180° direction regarding the angle θ with respect to the longitudinal direction of the base body 4*a* described above, the average value of the angles θ is 30° or larger and smaller than 60°, and in the case where the film 3 is biased in the 0° direction regarding the angle θ with respect to the longitudinal direction of the base body 4*a* described above, the average value of the angles θ is 120° or larger and smaller than 150°.

This will be described in detail below.

Evaluation of Pressing Roller

Evaluation of the pressing roller 4 manufactured by the manufacturing method for the tube-coated elastic roller described above will be described with reference to Examples 1 to 4 and Comparative Examples 1 to 4 that will be described later.

(I) Evaluation of Angles Formed Between Major Axis Direction Vectors of Pores and Axis of Pressing Member (I-1) The sample S was cut off from the elastic layer 4*b* of the pressing roller 4 by using a cutter. The sample S was taken for each of five regions into which the pressing roller 4 was evenly divided in the axial direction from a portion near the center of each region such that the sample S included the surface on the base body side to the surface on the releasing layer side, that is, such that the sample S included the whole thickness region of the portion of the elastic layer 4*b*. As a result of this, the size of each sample was 2.7 mm×2.7 mm×2.7 mm including just the elastic layer 4*b* without including the releasing layer 4*c*.

(I-2) The obtained sample S was measured by X-ray CT by using Xradia 520 Versa manufactured by CARL ZEISS. The measurement conditions were as follows: measurement resolution of 3 µm/voxel; acceleration voltage of 40 kV; exposure time of 2 seconds; 1601 times of image capturing; image capturing angle of 360°; and optical magnification of 4 times.

(I-3) The obtained three-dimensional image was evaluated as follows by using analysis software MATLAB 2015*b* and Image Processing toolbox 2015*b* available from Mathworks.

(I-3-1) Since the axis of the image and the sample surface are not parallel in the obtained image, the image was rotated such that the surface on the releasing layer side was parallel to the axis of the image. Then, the pore region, the base material region, and a non-sample region were separated by using the Otsu's method, and a binary image in which the pore region was expressed by 1 indicated by white and the other regions were expressed by 0 indicated by black was obtained.

(I-3-2) Then, opening processing using a sphere as a structuring element and the process of counting the number of independent pores by labelling processing were performed on the binary image while changing the diameter of the sphere serving as a structuring element from 2 voxel by an increment of 1 voxel until no pore is counted any longer. As a result of this, the relationship between the diameter of the sphere serving as a structuring element and the number of independent pores was obtained.

(I-3-3) A value twice the diameter of the sphere serving as a structuring element at which the number of independent pores took the maximum value was determined as a threshold value for extraction of pores. Large pores were extracted by performing opening processing on the binary image by using a sphere having the threshold value as the diameter as a structuring element.

(I-3-4) Then, labelling processing was performed to extract each individual large pore, and the following processing was performed on all the large pores. That is, an image in which the maximum value was projected onto a two-dimensional plane was generated, and the angle of the major axis direction vector and the position of center of gravity were calculated. At this time, projection is supposed to be performed in the Θ direction for accuracy. However, since the depth of the pores is small, there is hardly any difference between the projection in the Θ direction and projection in the depth direction. Therefore, the projection was linearly performed in the depth direction.

(I-3-5) The average value of angles of the major axis direction vectors of the large pores was calculated.

(II) Evaluation of Biasing Force on Fixing Film

Comparative Evaluation was performed by using the fixing apparatus 10 of a film heating system illustrated in FIG. 1 incorporating each of pressing rollers according to Examples and Comparative Examples. The pressing roller was rotationally driven such that the movement speed, that is, peripheral speed of the surface of the pressing roller was 246 mm/sec while the pressurizing force on one end side was about 156. 8N and the total pressurizing force was about 313.6 N, that is, about 32 kgf. The biasing force applied to the film 3 from the pressing roller 4 while the film 3 was rotationally driving in accordance with the rotation of the pressing roller 4 in a state in which the surface temperature of the film was adjusted to 170° C. was measured.

More specifically, load cells were disposed on the flanges serving as end portion regulation members for the film 3, and a force from the film 3 received by a load cell disposed near the edge portion of the film 3 on the biased side was measured as the biasing force.

(III) Durability of Fixing Film

The durability, or the lifetime, of the film 3 was evaluated as Good or Bad in accordance with the time from mounting the pressing roller of an example or a comparative example in the fixing apparatus of an electrophotographic apparatus of Type A or Type B to breakage of the film 3 or the edge surface of the film 3. Specifically, a case where the edge surface of the film 3 was broken before elapse of 300 hours by being rubbed by the flange due to the biasing force was evaluated as "Bad", and a case where the film 3 continued driving for 300 hours without the edge surface thereof being broken was evaluated was "Good".

Examples of manufacture of the pressing roller according to the present invention will be described below.

In each of pressing rollers of Examples 1 to 4 and pressing rollers of Comparative Examples 1 to 4, a core metal for A3 size formed from iron and having an outer diameter of φ24.5 mm was used as the base body 4a. The length of a region of the base body 4a where the elastic layer 4b was formed was 327 mm. As the primer applied on the peripheral surface of the core metal, "DY39-051", which is a product name of Dow Corning Toray Co., Ltd., was used. The primer was applied on the peripheral surface of the core metal, and then fired for 30 minutes at 180° C. in a hot air circulation oven.

As a liquid silicone rubber mixture for the elastic layer 4b formed on the peripheral surface of the core metal, a mixture obtained by mixing 100 parts by mass of a water-containing gel in 100 parts by mass of a liquid silicone rubber "DY35-2083" cross-linkable by an addition reaction in which polyether-modified silicone "FZ-2233" was mixed in advance as an emulsifier was used. "FZ-2233" and "DY35-2083" are product names of Dow Corning Toray Co., Ltd.

The water-containing gel was prepared by adding, in weight ratio, 99% of ion-exchanged water to 1% of a thickener "BENGEL W-200U" containing sodium polyacrylate as a main component and also containing a smectite-based clay mineral, and sufficiently stirring the system to cause swelling. "BENGEL W-200U" is a product name of HOJUN Co., Ltd., Further, as the needle-shaped filler 4b2, a pitch-based carbon fiber "XN-100-25M" having an average fiber diameter of 9 μm, an average fiber length of 250 μm, and a thermal conductivity of 900 W/(m·K) was used. This was mixed in a mixture liquid of the liquid silicone rubber and the water-containing gel by a volume ratio of 10%. "XN-100-25M" is a product name of GRANOC milled fiber manufactured by Nippon Graphite Fiber Corporation.

The liquid silicone rubber, the water-containing gel, and the needle-shaped filler were mixed and stirred at 80 rpm for 60 minutes by using a planetary-type universal mixing stirring machine HIVIS MIX model 2P-1 manufactured by PRIMIX, and thus water was dispersed in the liquid silicone rubber in an emulsified manner. As a result of this, the liquid silicone rubber mixture for forming the elastic layer 4b was obtained.

A fluorine resin tube formed from PFA having an inner diameter of φ29.5 was used for the releasing layer 4c, and the fluorine resin tube was disposed on the inner wall surface of the hollow mold 5 by folding back, onto the outer wall surface of the hollow mold 5 having an inner diameter of φ30.2, both end portions of the fluorine resin tube inserted in the hollow mold 5 in advance.

A primer "DY39-067", which is a product name of Dow Corning Toray Co., Ltd., was applied on the inner surface of the fluorine resin tube attached to the inner wall of the hollow mold 5, and drying was performed at 70° C. for 20 minutes in a hot air circulation oven. The core metal treated with a primer was concentrically placed in the hollow mold 5 in such an orientation that the driving shaft 4a-2 was on the upper mold pieces 7 and 13 side and the shaft 4a-1 was on the lower mold pieces 6 and 12 side, and the upper mold pieces 7 and 13 and the lower mold pieces 6 and 12 were respectively fit on the upper end portion and the lower end portion. Then, the upper outer mold piece 13 was clamped by a toggle clamp, and thus the core metal was concentrically fixed and placed in the cylindrical hollow mold 5.

After injecting the liquid rubber described above into the gap between the core metal and the fluorine resin disposed on the inner wall of the mold, the piece molds on both ends of the mold was sealed. Then, the upper outer mold piece 13 was pressed down from the upper side by the pressing apparatus 16 such that the rubber did not leak through fitting portions between the upper and lower outer mold pieces 12 and 13 and the hollow mold 5 by the expanding pressure of the liquid rubber in the mold in the subsequent curing step. Then, the outer wall of the mold was heated, and thus the liquid silicone rubber mixture was cured to form the elastic layer 4b.

To be noted, it is known that the biasing force on the film 3 when non-porous rubber is used for the elastic layer 4b of the pressing roller 4 incorporated in the fixing apparatus is about 5.0 N in the 0° direction in a fixing apparatus of a certain electrophotographic apparatus referred to as Type A. In addition, it is known that the biasing force described above is about 5.0 N in the 180° direction in a fixing apparatus of another electrophotographic apparatus referred to as Type B. The pressing roller was manufactured in accordance with the type of the fixing apparatus such that the angles of the pores are intentionally imparted in a direction cancelling the biasing force.

More specifically, 8 kinds of pressing rollers 4 of Examples 1 to 4 and Comparative Examples 1 to 4 shown below were manufactured on the basis of the difference in the heating method in the curing step of the sponge-forming liquid silicone rubber for forming the elastic layer 4b of the pressing roller 4.

Pressing Roller of Example 1

First, the heating metal plates 15a set to 77.5° C. were brought into contact with the outer wall of the upper outer mold piece 13, the heating metal plates 15c set to 82.5° C. were brought into contact with the outer wall of the lower outer mold piece 12, and thus heating was performed for 3 minutes. Then, heating of the hollow mold 5 was also started by bringing the heating metal plates 15b set to 80.0° C. into contact with the outer wall of the hollow mold 5.

At this time, the lower and upper outer mold pieces 12 and 13 were still being heated. When the total heating time reached 10 minutes since the start of heating of the lower and upper outer mold pieces 12 and 13, the heating metal plates 15a, 15b, and 15c were separated from the outer wall of the mold, and thus the heating was finished. That is, the heating time of the hollow mold 5 was 7 minutes.

By the heating step described above, the liquid silicone rubber composition was cured, and the core metal, the rubber, and the tube were integrally bonded together. This will be referred to as primary curing. After cooling the mold by air, the mold pieces 6, 12, 7, and 13 on both ends were detached. Then, the mold was left to stand for 100 minutes in a hot air circulation oven set to 180° C. in a state in which the both end portions of the mold were open, and thus the moisture in the elastic layer 4b was evaporated to form the pore portions 4b1. After cooling the mold, the tube-coated roller was released from the mold, and was left to stand for 4 hours in a hot air circulation oven set to 200° C. to perform secondary curing of the elastic layer 4b. The pressing roller 4 of Example 1 was obtained through these steps.

Pressing Roller of Example 2

The temperature of the heating metal plates 15a to be brought into contact with the outer wall of the upper outer mold piece 13 was set to 85° C., the temperature of the heating metal plates 15c to be brought into contact with the lower outer mold piece 12 was set to 95° C., and these plates were brought into contact with the corresponding walls to perform heating for 3 minutes. Then, heating of the hollow mold 5 was similarly started by bringing the heating metal plates 15b set to 90° C. into contact with the outer wall of the hollow mold 5. When the total heating time reached 10 minutes since the start of heating of the lower and upper outer mold pieces 12 and 13, the heating metal plates 15a, 15b, and 15c were separated from the outer wall of the mold, and thus the heating was finished. That is, the heating time of the hollow mold 5 was 7 minutes. After the heating step described above, the same steps as Example 1 were performed to obtain the pressing roller 4 of Example 2.

Pressing Roller of Example 3

The temperature of the heating metal plates 15a to be brought into contact with the outer wall of the upper outer mold piece 13 was set to 95° C., the temperature of the heating metal plates 15c to be brought into contact with the lower outer mold piece 12 was set to 85° C., and these plates were brought into contact with the corresponding walls to perform heating for 3 minutes. Then, heating of the hollow mold 5 was similarly started by bringing the heating metal plates 15b set to 90° C. into contact with the outer wall of the hollow mold 5. When the total heating time reached 10 minutes since the start of heating of the lower and upper outer mold pieces 12 and 13, the heating metal plates 15a, 15b, and 15c were separated from the outer wall of the mold, and thus the heating was finished. That is, the heating time of the hollow mold 5 was 7 minutes. After the heating step described above, the same steps as Example 1 were performed to obtain the pressing roller 4 of Example 3.

Pressing Roller of Example 4

The temperature of the heating metal plates 15a to be brought into contact with the outer wall of the upper outer mold piece 13 was set to 82.5° C., the temperature of the heating metal plates 15c to be brought into contact with the lower outer mold piece 12 was set to 77.5° C., and these plates were brought into contact with the corresponding walls to perform heating for 3 minutes. Then, heating of the hollow mold 5 was similarly started by bringing the heating metal plates 15b set to 80.0° C. into contact with the outer wall of the hollow mold 5. When the total heating time reached 10 minutes since the start of heating of the lower and upper outer mold pieces 12 and 13, the heating metal plates 15a, 15b, and 15c were separated from the outer wall of the mold, and thus the heating was finished. That is, the heating time of the hollow mold 5 was 7 minutes. After the heating step described above, the same steps as Example 1 were performed to obtain the pressing roller 4 of Example 4.

Pressing Roller of Comparative Example 1

The temperature of the heating metal plates 15a to be brought into contact with the outer wall of the upper outer mold piece 13 was set to 70° C., the temperature of the heating metal plates 15c to be brought into contact with the lower outer mold piece 12 was set to 80° C., and these plates were brought into contact with the corresponding walls to perform heating for 40 minutes. Then, heating of the hollow mold 5 was similarly started by bringing the heating metal plates 15b set to 75° C. into contact with the outer wall of the hollow mold 5. When the total heating time reached 100 minutes since the start of heating of the lower and upper outer mold pieces 12 and 13, the heating metal plates 15a, 15b, and 15c were separated from the outer wall of the mold, and thus the heating was finished. That is, the heating time of the hollow mold 5 was 60 minutes. After the heating step described above, the same steps as Example 1 were performed to obtain the pressing roller 4 of Comparative Example 1.

Pressing Roller of Comparative Example 2

The temperature of the heating metal plates 15a to be brought into contact with the outer wall of the upper outer mold piece 13 was set to 80° C., the temperature of the heating metal plates 15c to be brought into contact with the lower outer mold piece 12 was set to 100° C., and these plates were brought into contact with the corresponding walls to perform heating for 10 minutes. Then, heating of the hollow mold 5 was similarly started by bringing the heating metal plates 15b set to 90° C. into contact with the outer wall of the hollow mold 5. When the total heating time reached 25 minutes since the start of heating of the lower and upper outer mold pieces 12 and 13, the heating metal plates 15a, 15b, and 15c were separated from the outer wall of the mold, and thus the heating was finished. That is, the heating time of the hollow mold 5 was 15 minutes. After the heating step described above, the same steps as Example 1 were performed to obtain the pressing roller 4 of Comparative Example 2.

Pressing Roller of Comparative Example 3

The temperature of the heating metal plates 15a to be brought into contact with the outer wall of the upper outer mold piece 13 was set to 100° C., the temperature of the heating metal plates 15c to be brought into contact with the lower outer mold piece 12 was set to 80° C., and these plates were brought into contact with the corresponding walls to perform heating for 10 minutes. Then, heating of the hollow mold 5 was similarly started by bringing the heating metal plates 15b set to 90° C. into contact with the outer wall of the hollow mold 5. When the total heating time reached 25 minutes since the start of heating of the lower and upper outer mold pieces 12 and 13, the heating metal plates 15a, 15b, and 15c were separated from the outer wall of the mold, and thus the heating was finished. That is, the heating time of the hollow mold 5 was 15 minutes. After the heating step described above, the same steps as Example 1 were performed to obtain the pressing roller 4 of Comparative Example 3.

Pressing Roller of Comparative Example 4

The temperature of the heating metal plates 15a to be brought into contact with the outer wall of the upper outer mold piece 13 was set to 80° C., the temperature of the heating metal plates 15c to be brought into contact with the lower outer mold piece 12 was set to 70° C., and these plates were brought into contact with the corresponding walls to perform heating for 40 minutes. Then, heating of the hollow mold 5 was similarly started by bringing the heating metal plates 15b set to 75° C. into contact with the outer wall of the hollow mold 5. When the total heating time reached 100 minutes since the start of heating of the lower and upper outer mold pieces 12 and 13, the heating metal plates 15a, 15b, and 15c were separated from the outer wall of the mold, and thus the heating was finished. That is, the heating time of the hollow mold 5 was 60 minutes. After the heating step described above, the same steps as Example 1 were performed to obtain the pressing roller 4 of Comparative Example 4.

The angle formed by the major axis direction vector of the pores and the rotation axis of the pressing roller, and the biasing force on and durability of the film 3 when the pressing roller was incorporated in each of fixing apparatuses of Type A and Type B were measured for each of the processing rollers of Examples and Comparative Examples. The results are shown in Table 1.

It can be seen that the biasing forces when the pressing rollers 4 of Examples 1 to 4 were incorporated in fixing apparatuses of Types A and B were small as compared with Comparative Examples 1 to 4. In addition, in the case where the pressing rollers 4 of Comparative Examples 1 to 4 were used, the film 3 rotated in accordance with the pressing roller 4 did not last 300 hours and was broken from the edge surface thereof. In contrast, in the case where the pressing rollers 4 of the Examples 1 to 4 were used, the film 3 was not broken from the edge surface thereof, and kept on rotating for 300 hours.

The results described above can be explained by the following idea.

1) In the fixing apparatus of Type A, an urging force biasing the film 3 toward the 0° direction acts by default due to the deviation of degree of parallel between the film 3 and the pressing roller 4 derived from the degree of parallel or warpage of the fixing frames.

Therefore, a pressing roller whose elastic layer 4b includes pore portions having appropriate orientation angles in the 180° direction is incorporated as the pressing roller. In this case, the average value of the angles θ is 120° or larger and smaller than 150°. As a result of this, an urging force in the 180° direction is applied to the film 3 when the film 3 is in pressure contact with and rotated in accordance with the pressing roller 4, and therefore the biasing force, that is, abutting force of the film on the flange serving as an end portion regulation member is reduced as a result.

However, even when the orientation angles of the pore portions are in the 180° direction, in the case where the average value of the angles θ is smaller than 120° or equal to or larger than 150°, the urging force applied to the film 3 by the rotation of the pressing roller 4 is weak and insufficient for suppressing the biasing force derived from the deviation of degree of parallel.

2) In contrast, in the fixing apparatus of Type B, conversely to Type A, an urging force biasing the film 3 in the 180° direction acts due to the deviation of degree of parallel.

Therefore, the pressing roller 4 whose elastic layer 4b includes pore portions having appropriate orientation angles in the 0° direction is incorporated as the pressing roller. In this case, the average value of the angles θ is 30° or larger and smaller than 60°. As a result of this, an urging force in the 0° direction is generated by the rotation of the pressing roller 4 in pressure contact, and therefore the biasing force is reduced as a result.

However, even when the orientation angles of the pore portions are in the 0° direction, in the case where the average value of the angles θ is smaller than 30° or equal to or larger than 60°, the urging force applied to the film 3 by the

TABLE 1

|  | Fixing Apparatus | Mold Temperature [° C.] | | | Angle [°] | Biasing Force [N] | Durability of Fixing Film |
|---|---|---|---|---|---|---|---|
|  |  | Upper Piece 13 | Mold 5 | Lower Piece 12 |  |  |  |
| Example 1 | Type A | 77.5 | 80 | 82.5 | 122 | 2.0 | Good |
| Example 2 | Type A | 85 | 90 | 95 | 149 | 2.5 | Good |
| Example 3 | Type B | 95 | 90 | 85 | 31 | 2.3 | Good |
| Example 4 | Type B | 82.5 | 80 | 77.5 | 57 | 1.9 | Good |
| Comparative Example 1 | Type A | 70 | 75 | 80 | 100 | 4.1 | Bad |
| Comparative Example 2 | Type A | 80 | 90 | 100 | 165 | 3.5 | Bad |
| Comparative Example 3 | Type B | 100 | 90 | 80 | 10 | 4.5 | Bad |
| Comparative Example 4 | Type B | 80 | 75 | 70 | 71 | 3.9 | Bad | rotation of the pressing roller 4 is weak and insufficient for suppressing the biasing force derived from the deviation of degree of parallel.

OTHER NOTES (1) Examples of the fixing apparatus according to the present invention also include an image modification apparatus that modifies the degree of glossiness or the like of an image that has been fixed or temporarily fixed to a recording material, that is, a fixed image or a semi-fixed image. This apparatus is also referred to as a fixing apparatus.

(2) The heating mechanism that heats the film is not limited to the ceramic heater 1 of the exemplary embodiment. Heating mechanisms of internal heating system and external heating system such as a halogen heater and an infrared lamp can be also used. The heating mechanism may be an excitation coil or a magnetic field generation unit including an excitation coil and a magnetic core that causes induction heating of the film 3 or a film heating member.

(3) The system for introducing the recording material of the fixing apparatus may be a so-called center conveyance system or a so-called one-sided conveyance system.

(4) The fixing apparatus of the exemplary embodiment may be also used in image forming apparatuses other than the monochromatic electrophotographic printer or the monochromatic copier of the exemplary embodiment, such as color copiers, facsimile machines, color printers, and multifunctional apparatuses of these. That is, the fixing apparatus and the monochromatic electrophotographic printer or copier of the exemplary embodiment are not limited to the combination of constituent elements described above, and may be realized in a different form in which part or all of the elements are replaced by substituent members.

(5) The image forming system of the image forming portion of the image forming apparatus is not limited to the electrophotographic system. The image forming portion may be of another system such as an electrostatic recording system or a magnetic recording system. In addition, the image forming portion is not limited to a transfer system. The image forming portion may be of a system that directly forms an unfixed image on a recording material.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-130413, filed Jul. 10, 2018, which is hereby incorporated by reference herein in its entirety.

What is claimed is:

1. A fixing apparatus comprising:
an endless belt;
regulation members against which end portions of the endless belt abut so that a movement of the endless belt is regulated;
a pressing member comprising a base body, an elastic layer formed on the base body, and a fluorine resin layer formed on the elastic layer, the pressing member being in contact with the endless belt to form a nip portion where a recording material bearing an image is nipped, conveyed, and heated; and
a motor configured to rotate the pressing member for rotating the belt,
wherein a portion in which ellipsoidal pores are connected with each other is provided in the elastic layer, and
wherein the pressing member is disposed such that the ellipsoidal pores have a major axis direction that is opposite to an inclination direction with respect to a rotation axis direction of the pressing member, and such that an angle between the major axis direction and the inclination direction is from 120° to less than 150°, the major axis direction being a direction toward an outer surface of the pressing member from the base body along a major axis of a large pore when viewed in a direction orthogonal to the rotation axis direction, the inclination direction being a direction in which the belt moves toward either side along the rotation axis direction in response to rotation of a test pressing roller when the pressing member is replaced to the test pressing roller including an elastic layer formed of a non-porous rubber,
where the large pore is extracted in such a manner that:
(i) an opening processing using a sphere as a structuring element and a process of counting a number of independent pores by labelling processing are performed on a binary image generated from a three-dimensional image of the elastic layer while changing a diameter of the sphere serving as the structuring element from 2 voxel by an increment of 1 voxel until no pore is counted any longer; and
(ii) a value twice the diameter of the sphere serving as the structuring element at which the number of independent pores took the maximum value is determined as a threshold value for extraction of pores and the large pore is extracted by performing opening processing on the binary image by using a sphere having the threshold value as the diameter as a structuring element.

2. The fixing apparatus according to claim 1, wherein the elastic layer is formed from a liquid rubber composition containing water.

3. The fixing apparatus according to claim 2, wherein the liquid rubber composition containing water is an emulsion composition containing a liquid silicone rubber composition and water.

4. The fixing apparatus according to claim 2, wherein a ratio of water in the liquid rubber composition is 40 vol % to 60 vol %.

5. The fixing apparatus according to claim 2, wherein the liquid rubber composition contains needle-shaped filler.

6. The fixing apparatus according to claim 5, wherein the needle-shaped filler is a pitch-based carbon fiber.

7. The fixing apparatus according to claim 1, wherein a ratio of the portion in which the ellipsoidal pores are connected with each other in the elastic layer is 40 vol % to 60 vol %.

* * * * *